US012784499B2

(12) United States Patent
Kyienko-Romaniuk et al.

(10) Patent No.: US 12,784,499 B2
(45) Date of Patent: Nov. 3, 2026

(54) ANALYZING EMOTION IN ONE OR MORE VIDEO MEDIA STREAMS

(71) Applicant: NICE LTD., Ra'anana (IL)

(72) Inventors: Ievgenii Kyienko-Romaniuk, Vinnytsia (UA); Ihor Pastukh, Vinnytsia (UA); Oksana Lisnychenko, Vinnytsia (UA); Olena Bozhko, Vinnitsa (UA); Yevgen Gavdan, Vinnitsa (UA); Yurij Shinkaruk, Vinnitsa (UA)

(73) Assignee: Nice Ltd., Ra'anana (IL)

( * ) Notice: Subject to any disclaimer, the term of this patent is extended or adjusted under 35 U.S.C. 154(b) by 424 days.

(21) Appl. No.: 18/184,099

(22) Filed: Mar. 15, 2023

(65) Prior Publication Data

US 2024/0312250 A1 Sep. 19, 2024

(51) Int. Cl.

*G06V 40/16* (2022.01)
*G06V 10/82* (2022.01)
*G06V 20/40* (2022.01)

(52) U.S. Cl.

CPC ............ *G06V 40/174* (2022.01); *G06V 10/82* (2022.01); *G06V 20/41* (2022.01); *G06V 40/161* (2022.01)

(58) Field of Classification Search

CPC ...... G06V 40/174; G06V 10/82; G06V 20/41; G06V 40/161; G06V 40/20; G06V 40/40; G10L 25/63; G10L 17/26; G06F 2203/011; G06F 16/784; A61B 5/165; G06T 13/40; G06T 2207/30201; G06T 2207/20081;

(Continued)

(56) References Cited

U.S. PATENT DOCUMENTS 10,044,865 B2 * 8/2018 Dumaine ................ G06F 18/24
10,706,873 B2 * 7/2020 Tsiartas ............... G10L 15/1822

(Continued)

FOREIGN PATENT DOCUMENTS

EP 3271870 B1 * 6/2023 ........... G06V 40/167
KR 20200063292 A * 6/2020 ............. G06N 20/00

(Continued)

OTHER PUBLICATIONS

English translation of KR-20200063292-A (Year: 2020).*

(Continued)

*Primary Examiner* — John Villecco
(74) *Attorney, Agent, or Firm* — Trupti P. Joshi

(57) ABSTRACT

Analyzing emotion in a videoconference includes receiving video media stream(s) of a user participating in the videoconference. A face of the user is detected in frame(s) of the video media stream(s). An emotional state of the user is classified. In one or more embodiments, an emotional score for the user is assigned and visualized on a display. In one or more embodiments, additional video media stream(s) of additional user(s) participating in the videoconference are also received, corresponding face(s) of the additional user(s) are also detected, and corresponding emotional state(s) of the additional user(s) are also classified. In one or more embodiments, emotional score(s) for the additional user(s) are also assigned and visualized on the display, together with the emotional score for the user. Additionally, or alternatively, a combined emotional score for the user and the additional user(s) may be assigned and visualized on the display.

20 Claims, 18 Drawing Sheets

(58) Field of Classification Search
CPC .... G06T 2207/30196; H04N 21/44218; H04N 21/23418; G16H 20/70
See application file for complete search history.

(56) References Cited

U.S. PATENT DOCUMENTS

| | | | | |
|---|---|---|---|---|
| 10,880,601 | B1 * | 12/2020 | Donahoe | G06V 40/174 |
| 11,017,239 | B2 * | 5/2021 | Pranger | G06V 20/46 |
| 11,417,318 | B2 * | 8/2022 | Reece | G06N 20/00 |
| 11,417,330 | B2 * | 8/2022 | Reece | G06N 3/044 |
| 11,521,620 | B2 * | 12/2022 | Reece | G06F 40/35 |
| 11,810,357 | B2 * | 11/2023 | Reece | G06F 40/169 |
| 11,887,352 | B2 * | 1/2024 | el Kaliouby | H04L 12/1831 |
| 12,073,851 | B2 * | 8/2024 | Reece | G06F 18/2413 |
| 12,288,560 | B2 * | 4/2025 | Reece | G06F 40/169 |
| 2016/0042226 | A1 * | 2/2016 | Cunico | H04N 7/152 382/103 |
| 2016/0073054 | A1 * | 3/2016 | Balasaygun | H04L 12/1822 348/14.08 |
| 2016/0078279 | A1 * | 3/2016 | Pitre | G16H 20/70 382/118 |
| 2016/0212466 | A1 * | 7/2016 | Nauseef | H04N 21/4223 |
| 2016/0234551 | A1 * | 8/2016 | Allegretti | H04N 21/854 |
| 2016/0241533 | A1 * | 8/2016 | Bist | H04N 21/8455 |
| 2018/0303397 | A1 * | 10/2018 | Krupat | G06Q 30/0271 |
| 2019/0251359 | A1 * | 8/2019 | Pranger | G06V 40/174 |
| 2020/0022631 | A1 * | 1/2020 | Lee | A61B 5/16 |
| 2020/0288206 | A1 * | 9/2020 | Bist | G06Q 10/40 |
| 2021/0021439 | A1 * | 1/2021 | Gorny | H04L 12/1822 |
| 2021/0034891 | A1 * | 2/2021 | Yamataka | G06V 40/176 |
| 2021/0076002 | A1 * | 3/2021 | Peters | H04N 7/152 |
| 2021/0150190 | A1 * | 5/2021 | Kelly | G06V 40/176 |
| 2021/0264162 | A1 * | 8/2021 | Reece | G06V 40/174 |
| 2021/0264909 | A1 * | 8/2021 | Reece | G06F 18/25 |
| 2022/0343911 | A1 * | 10/2022 | Reece | G06F 18/2413 |
| 2023/0206135 | A1 * | 6/2023 | Kumar | G06N 5/01 706/12 |
| 2024/0371393 | A1 * | 11/2024 | Reece | G06F 18/2413 |
| 2025/0260766 | A1 * | 8/2025 | Paliwal | G06N 3/02 |

FOREIGN PATENT DOCUMENTS

| | | | | | |
|---|---|---|---|---|---|
| KR | 20200131367 | A | * | 11/2020 | G06V 10/25 |
| RU | 2768545 | C1 | * | 3/2022 | G06F 18/00 |
| TW | 202303444 | A | * | 1/2023 | G06N 3/0442 |

OTHER PUBLICATIONS

English Text translation of RU-2768545-C1 (Year: 2022).*
English text translation of TW-202303444-A (Year: 2023).*
OpenCV (Nov. 2018). "Cascade Classifier". Published at https://docs.opencv.org/4.0.0/db/d28/tutorial_cascade_classifier.html.*

* cited by examiner

236d

```
{
    "callChainId" : "aa202e00-a71f-4332-95f4-52423936d400",
    "participants" :  [ {
        "participantId" : "a124c7c9-5539-47ed-861a-fde00e71751b",
        "values" :  [ {
            "time" :  0,
            "emotion" :  "neutral"
        } , {
            "time" :  500,
            "emotion" :  "neutral"
        } , {
            "time" :  1000,
            "emotion" :  "neutral"
        } , {
            "time" :  1500,
            "emotion" :  "neutral"
        } , {
            "time" :  2000,
            "emotion" :  "neutral"
        } ]
    }  , {
        "participantId" : "5539c7c9-5aaw-77ed-8asd-fdeqqw7kkj1b",
        "values" :  [ {
            "time" :  0,
            "emotion" :  "neutral"
        } , {
            "time" :  500,
            "emotion" :  "neutral"
        } , {
            "time" :  1000,
            "emotion" :  "happy"
        } , {
            "time" :  1500,
            "emotion" :  "happy"
        } , {
            "time" :  2000,
            "emotion" :  "happy"
        } ]
    }  , {
}
```

FIG. 12

200

245 240

| Type | Complete ID | Emotional Score | Full Name | Complete Start Time ▽ | Complete Stop Time | Complete Duration | Direction Type Description |
|---|---|---|---|---|---|---|---|
| | 7124984185975013437 | | Agent, 8003 | 27/07/2022 12:37:36 | 27/07/2022 12:38:44 | 00:01:08 | Outgoing |
| | 7124983219607371829 | | Agent, 8003 | 27/07/2022 12:33:49 | 27/07/2022 12:34:50 | 00:01:01 | Internal |
| | 7124982360613912621 | | Agent, 8003 | 27/07/2022 12:30:30 | 27/07/2022 12:31:09 | 00:00:39 | Internal |
| | 7124981351296598054 | | Agent, 8003 | 27/07/2022 12:26:36 | 27/07/2022 12:27:46 | 00:01:10 | Outgoing |
| | 7124980376339021854 | | Agent, 8003 | 27/07/2022 12:22:49 | 27/07/2022 12:23:50 | 00:01:01 | Outgoing |
| | 7124979289712295960 | | Agent, 8003 | 27/07/2022 12:18:53 | 27/07/2022 12:20:01 | 00:01:08 | Incoming |
| | 7124978254625177619 | | Agent, 8003 | 27/07/2022 12:14:52 | 27/07/2022 12:15:37 | 00:00:46 | Incoming |
| | 7124977245307863050 | | Agent, 8002 | 27/07/2022 12:10:57 | 27/07/2022 12:11:36 | 00:00:39 | Incoming |
| | 7124976175861006339 | | Agent, 8002 | 27/07/2022 12:06:48 | 27/07/2022 12:07:35 | 00:00:47 | Incoming |
| | 7124975205198397441 | | Agent, 8002 | 27/07/2022 12:03:03 | 27/07/2022 12:03:33 | 00:00:30 | Incoming |
| | 7124973560213340351 | | avaya, 82025 | 27/07/2022 11:56:25 | 27/07/2022 11:57:59 | 00:01:34 | Outgoing |
| | 7124973122126676157 | | avaya, 82024 | 27/07/2022 11:54:40 | 27/07/2022 11:55:33 | 00:00:53 | Incoming |
| | 7124972705514848443 | | avaya, 82024 | 27/07/2022 11:53:03 | 27/07/2022 11:53:55 | 00:00:53 | Incoming |
| | 7124972211593609400 | | avaya, 82024 | 27/07/2022 11:51:07 | 27/07/2022 11:52:17 | 00:01:10 | Internal |
| | 7124971790686814389 | | avaya, 82024 | 27/07/2022 11:49:30 | 27/07/2022 11:50:15 | 00:00:45 | Internal |
| | 7124971365485052078 | | avaya, 82024 | 27/07/2022 11:47:54 | 27/07/2022 11:48:40 | 00:00:46 | Outgoing |

POSITIVE NEGATIVE NEUTRAL

FIG. 13

ANALYZING EMOTION IN ONE OR MORE VIDEO MEDIA STREAMS

TECHNICAL FIELD

The present disclosure relates generally to videoconferencing applications, and, more particularly, to apparatus, systems, and methods for analyzing emotion in one or more video media streams.

BACKGROUND

In a rapidly changing world, contact centers, including Contact Center as a Service (CCaaS) platforms and Unified Communications as a Service (UCaaS) platforms, have been challenged to adjust to new technologies and other challenges (e.g., the COVID pandemic). As a result, many contact centers have started using video calls instead of just voice calls in their customer interactions, which opens up a huge additional source of information that can be studied, analyzed, and used for future improvements. In this regard, nonverbal communication often conveys more meaning than verbal communication. Indeed, by some measures, nonverbal communication accounts for 60 to 70 percent of human communication on the whole, and many trust nonverbal communication over verbal communication.

Currently, contact center supervisors and managers have a limited number of tools available to help them monitor interactions between agents and customers in real time with video. For this reason, it would be incredibly beneficial for contact centers to have the capability to analyze nonverbal communications (e.g., facial expressions, gestures, body language, etc.) during video calls between agents and customers. For example, video-based emotion detection would be a beneficial addition to voice-based emotion detection for recorded calls since it would increase the accuracy of the detected emotion and provide even better granularity of detected emotions. Such capability would enable contact centers to provide training to agents identified as needing to improve their nonverbal communication in a way that will inspire trust and confidence in their customers. Therefore, what is needed is an apparatus, system, and/or method that helps address one or more of the foregoing issues.

BRIEF DESCRIPTION OF THE DRAWINGS

FIG. 12 is a graphical illustration of step of the method of FIG. 11, namely depicting a script with the emotional score history for each videoconference participant, according to one or more embodiments.

FIG. 13 is a graphical illustration of yet another visualization, said yet another visualization including a combined emotional score for two or more videoconference participants, according to one or more embodiments.

DETAILED DESCRIPTION

The present disclosure provides contact centers, including CCaaS and UCaaS platforms, with the capability to analyze nonverbal communications during video calls between agents and customers, thereby enabling them to: implement agent training (i.e., coaching packages) for those identified as needing to improve their nonverbal communication skills; implement call routing changes; implement quality management changes; alert supervisors and managers; implement changes to agents' profiles; improve customer satisfaction ("CSAT") scores; or any combination thereof. In one or more embodiments, an end-to-end solution utilizing machine learning for real-time emotion detection for contact center optimization flows is provided. The presently-disclosed machine-learning-based service is adapted to recognize the emotions of participants during an active video call, or after completion of the video call. For example, the solution is capable of tagging calls and providing timestamps where participants have positive, neutral, and negative emotions for further analysis. For another example, the solution can be trained, using machine learning, based on call centers' own customer data to align with specific needs and expectations. For yet another example, data received from the solution during live video calls can be used to track uncommon or suspicious behavior of one or more participants to improve fraud detection. As a result, the present disclosure enables any company utilizing contact centers to increase the accuracy of their customer interaction analyses, improve their agents' skills, and identify fraud attempts more successfully.

Figure 1:
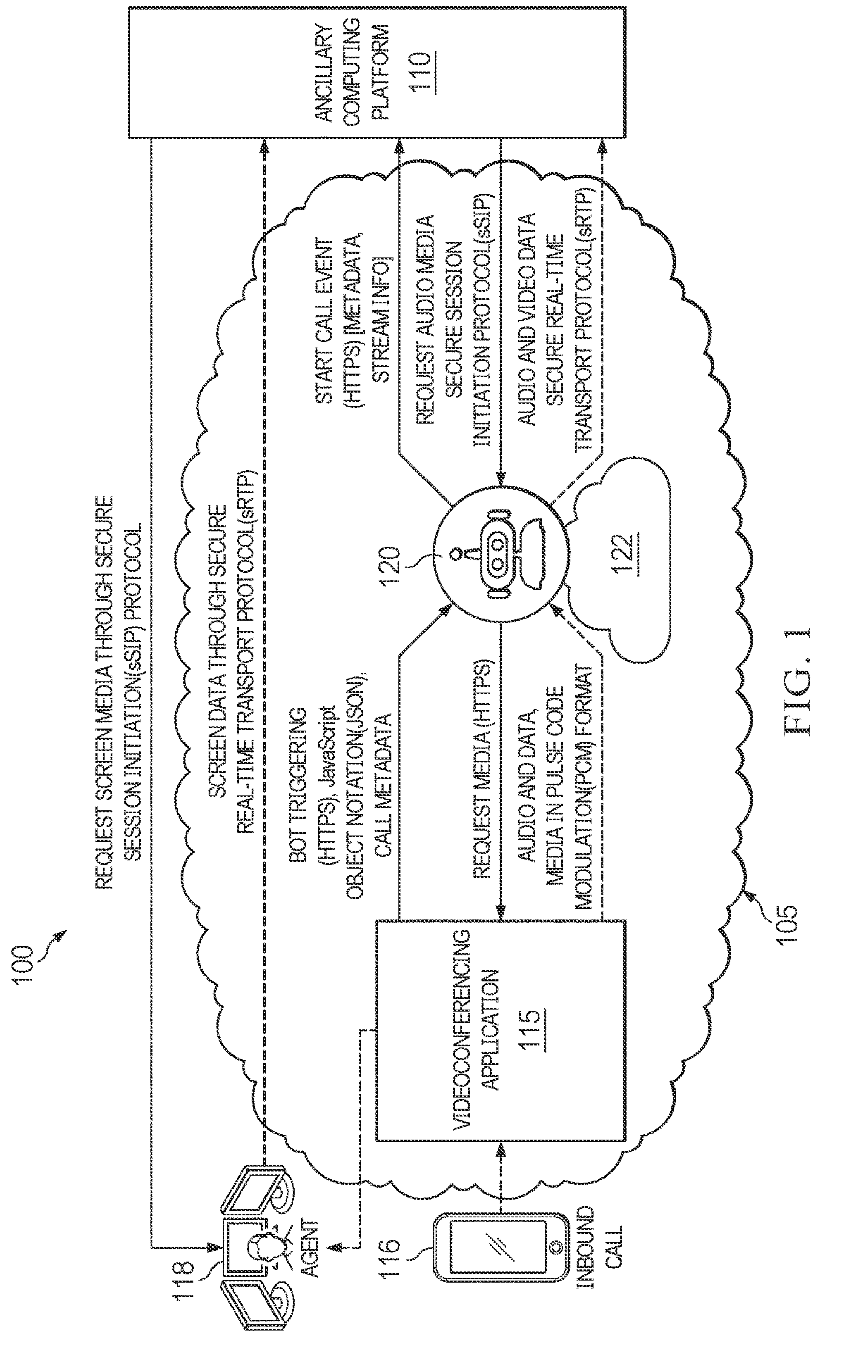
FIG. 1 is a diagrammatic illustration of a system, according to one or more embodiments.

Referring to FIG. 1, in an embodiment, a system is generally referred to by the reference numeral 100. The system 100 includes, and/or is at least partially implemented on, a host computing platform 105, an ancillary computing platform 110, and a videoconferencing application 115. In one or more embodiments, the host computing platform 105 is cloud-based. For example, the host computing platform 105 may be, include, or be part of the Microsoft Azure® infrastructure. Alternatively, or additionally, the host computing platform 105 may be, include, or be part of another computing platform. In one or more embodiments, the ancillary computing platform 110 is cloud-based. For example, the ancillary computing platform 110 may be, include, or be part of the NICE Engage® platform. The videoconferencing application 115 is capable of facilitating videoconferences (between any number of users, such as, for example, two (2), three (3), four (4), five (5), six (6), seven (7), eight (8), nine (9), ten (10), or more) in which participants at different locations are able to communicate with each other orally and visually. For example, FIG. 1 illustrates the videoconferencing application 115 facilitating a videoconference between an inbound caller on a mobile computing device 116 and an agent on computing device 118. In one or more embodiments, the videoconferencing application 115 is hosted on the host computing platform 105. For example, the videoconferencing application 115 may be, include, or be part of the Microsoft Teams® videoconferencing application (which is part of the Microsoft Office 365® application suite), and be hosted in the Microsoft Azure® infrastructure. Alternatively, or additionally, the videoconferencing application 105 may be, include, or be part of another videoconferencing application, and/or be hosted on another computing platform.

Figure 2:
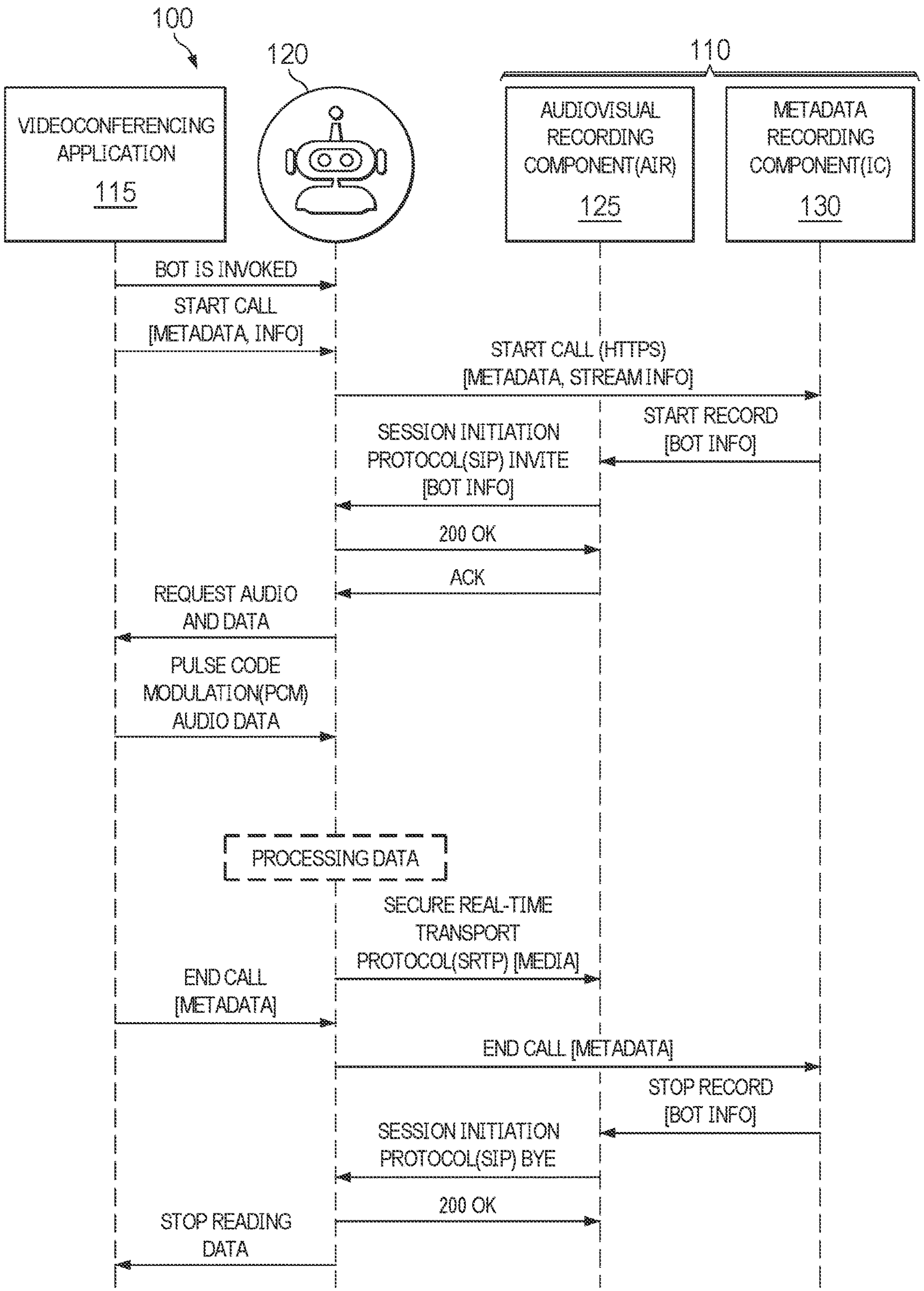
FIG. 2 is a diagrammatic illustration of a flow sequence of the system of FIG. 1, according to one or more embodiments.

Turning also to FIG. 2, with continuing reference to FIG. 1, in an embodiment, the system 100 also includes an integration program (or "bot") 120 operable to interface between the videoconferencing application 115 (e.g., Microsoft Teams®), the ancillary computing platform 110 (e.g., NICE Engage®), and, optionally, other products. For example, the integration program 120 may be, include, or be part of the NICE Bot Service ("NBS") application. In such instance(s), the presently-disclosed machine learning approach for recognizing emotions based on participants' facial expressions, body language, gestures, etc., from Microsoft Teams® video calls enhances the analytics capabilities of such interactions. In one or more embodiments, the integration program 120 interfaces with the videoconferencing application 115 via an account 122 (e.g., a Microsoft Azure® account) hosted on the host computing platform 105. As shown in FIG. 2, the ancillary computing platform 110 includes an audiovisual recording component ("AIR") 125, which manages call media storage and retrieval, and a metadata recording component ("IC") 130, which manages call metadata storage and retrieval. More particularly, FIG. 2 (and FIG. 1) diagrammatically illustrates the data flow between the videoconference application 115 (e.g., Microsoft Teams®)—hosted on the host computing platform 105 (e.g., Microsoft Azure®)—and the ancillary computing platform 110 (e.g., Nice Engage®), which includes the AIR 125 and the IC 130. Accordingly, in one or more embodiments, the integration program 120 enables real-time processing by the ancillary computing platform 110 of video frames received from the videoconference application 115 hosted on the host computing platform 105, as will be described in further detail below.

Figure 3:
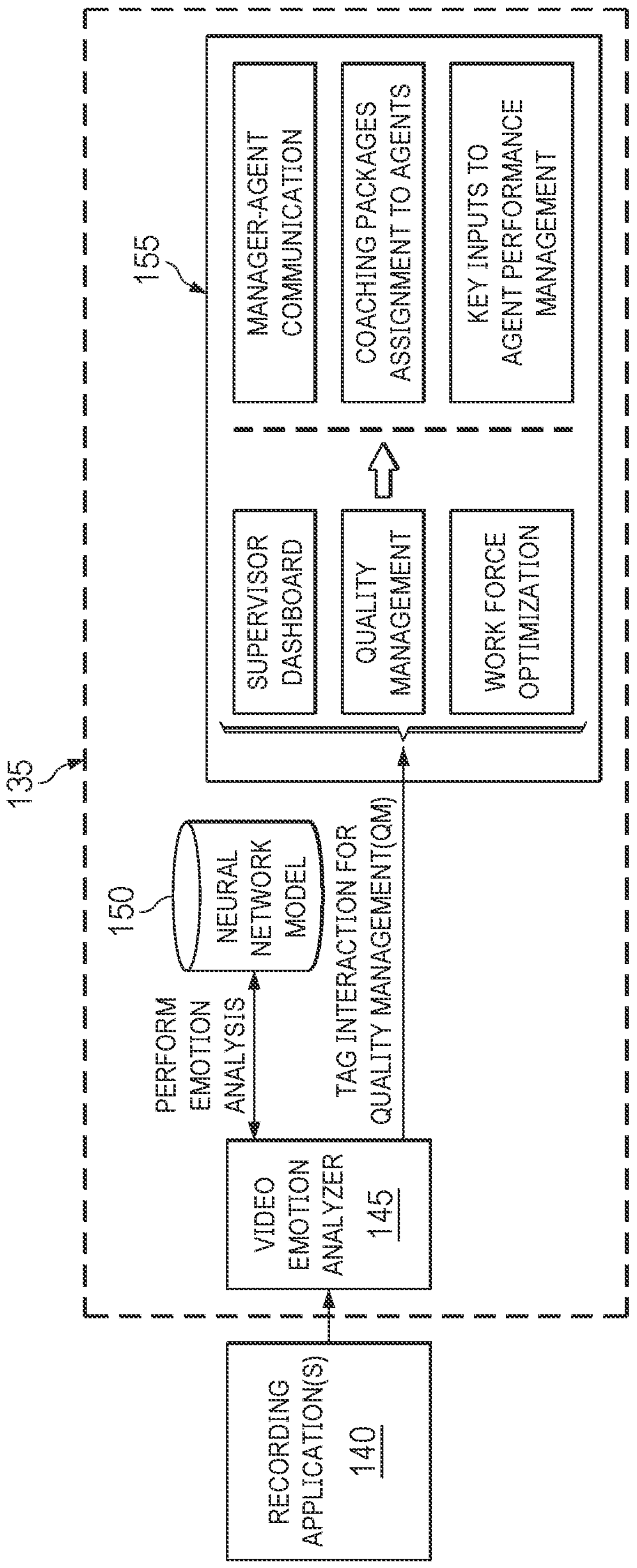
FIG. 3 is a diagrammatic illustration of an architecture for analyzing emotion in one or more media streams, according to one or more embodiments.

Referring to FIG. 3, with continuing reference to FIGS. 1 and 2, in an embodiment, an architecture for analyzing emotion in one or more media streams is diagrammatically illustrated and generally referred to by the reference numeral 135. The architecture 135 is configured to receive the one or more media streams from one or more recording application (s) 140, and includes a video emotion analyzer 145, a neural network model 150, and a dashboard 155. The one or more recording applications 140 are equipped with tools for recording calls, which tools are capable of supporting both audio and video data. For example, in one or more embodiments, the one or more recording applications 140 may be, include, or be part of the host computing platform 105, the ancillary computing platform 110, the video conference application 115, the integration program 120, the AIR 125, and/or the IC 130, as shown and described above in connection with FIGS. 1 and 2, another recording application, the like, or any combination thereof. The video emotion analyzer 145 communicates with the recording application 140, and is or includes a service for recognizing facial emotions based on video frames received from the recording application 140. The neural network model 150 communicates with the video emotion analyzer 145, and is or includes a pre-trained neural network model such as, for example, a convolutional neural network ("CNN") model adapted to classify facial emotions. The dashboard 155 communicates with the video emotion analyzer 145, and is or includes a tool that allows supervisor(s) to monitor agents' interactions with customers in real-time via video, and to coach agents in order to encourage and foster the skills needed for positive video-based customer interactions.

Figure 4:
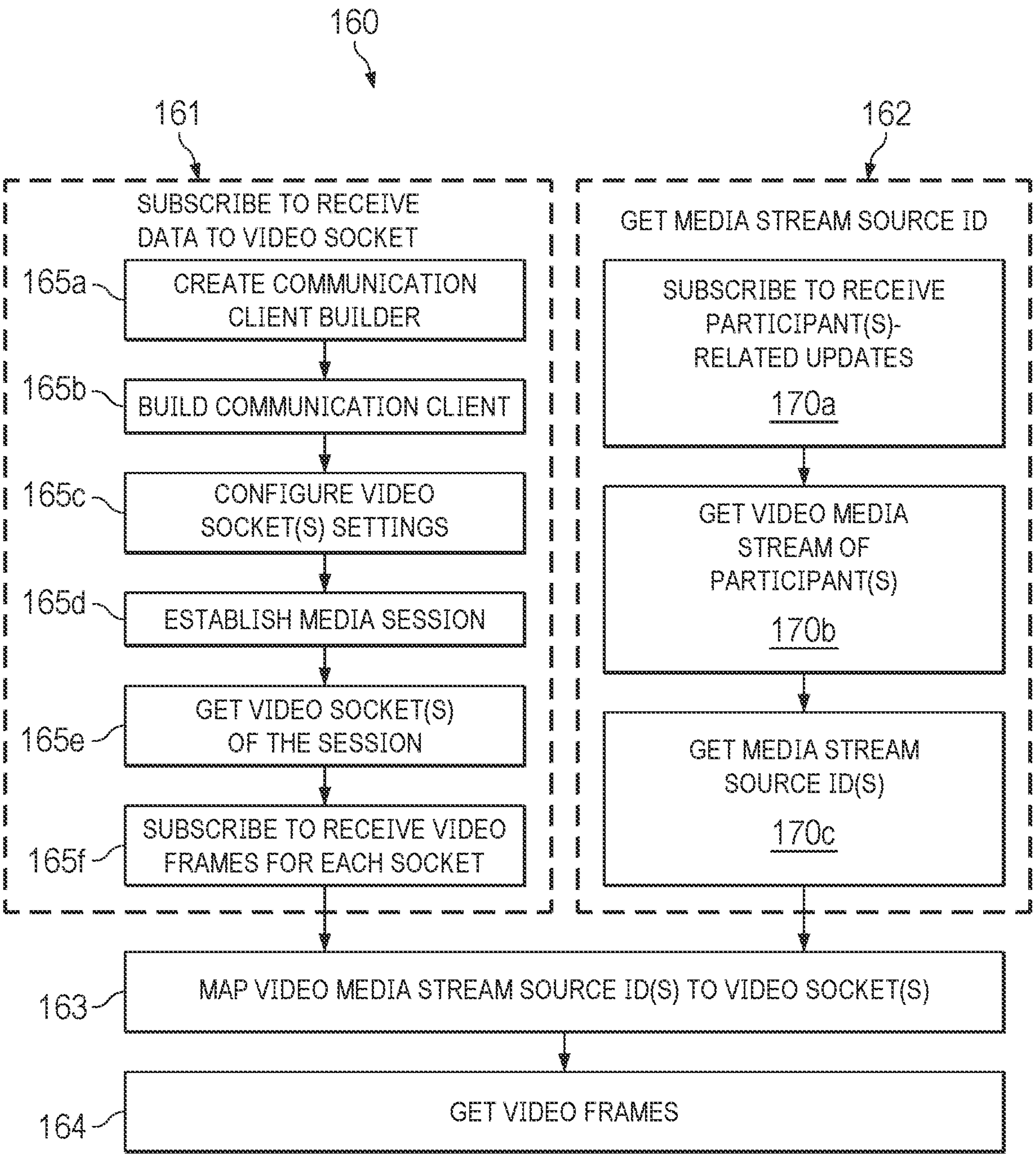
FIG. 4 is a flow diagram of a method for receiving the one or more video media streams of FIG. 3 from a videoconferencing application of the system of FIGS. 1 and 2, according to one or more embodiments.

Referring to FIG. 4, with continuing reference to FIGS. 1 through 3, in an embodiment, a method for receiving video media from the videoconferencing application 115 (e.g., Microsoft Teams®) is generally referred to by the reference numeral 160. In one or more embodiments, the method 160 is implemented via the account 122 (shown in FIG. 1) (e.g., using Microsoft Graph®, which is a RESTful web API that enables access to Microsoft's cloud service resources). For example, the NICE Bot Service™ application (i.e., the integration program 120) may record Microsoft Teams® (i.e., the videoconferencing application 115) video interactions using Microsoft Graph API, through one or more of the following Microsoft software development kits (SDKs): 'Graph Communications Core', 'Graph Communications', 'Graph Communications Calling', 'Graph Communications Media' and 'Graph Communications Bot Media'. In such embodiment(s), the method 160 may include: at a step 161, subscribing to receive data to one or more video sockets; at a step 162, getting one or more media stream source identifications; at a step 163, mapping the one or more video media stream source identifications to the one or more video sockets; and at a step 164, getting video frames.

In one or more embodiments, the step 161 of subscribing to receive data to the one or more video sockets includes:

- at a sub-step 165*a*, creating a communication client builder—for example, the sub-step 165*a* may include creating an instance of 'CommunicationClientBuilder'-class ('Microsoft.Graph.Communications.Client'-library of the 'Graph Communications'-SDK);

at a sub-step 165*b*, building the communication client—for example, the sub-step 165*b* may include calling 'Build'-method of the 'CommunicationClientBuilder'-class ('Microsoft.Graph.Communications.Client'-library of the 'Graph Communications'-SDK) using the communication client builder created in sub-step 165*a;* at a sub-step 165*c*, configuring the setting for the one or more video sockets—for example, the sub-step 165*c* may include creating an instance of the 'VideoSocket-Settings'-class ('Microsoft.Skype.Bots.Media'-library of the 'Graph Communications Bot Media'-SDK) for each video socket that is planned to be used;

at a sub-step 165*d*, establishing a media session—for example, the sub-step 165*d* may include calling 'CreateMediaSession'-method of the 'MediaCommunicationsClientExtensions'-class ('Microsoft.Graph.Communications.Calls.Media'-library of the 'Graph Communications Media'-SDK) providing the video socket(s) settings created in sub-step 165*c;* at a sub-step 165*e*, getting the one or more video sockets of the session—for example, the sub-step 165*e* may include getting 'VideoSocket'- or 'VideoSockets'-property of the established media session ('ILocalMediaSession'-interface of ('Microsoft.Graph.Communications.Calls.Media'-library of the 'Graph Communications Media'-SDK) for each of video socket(s) settings provided in sub-step 165*d*; and at a sub-step 165*f*, subscribing to receive video frames for each video socket—for example, the sub-step 165*f* may include subscribing to 'VideoMediaReceived'-event ('IVideoSocket'-interface of the 'Microsoft.Skype.Bots.Media'-library of the 'Graph Communications Bot Media'-SDK).

In one or more embodiments, the step 162 of getting the one or more media stream source identifications includes:

at a sub-step 170*a*, subscribing to receive participant-related updates—for example, the sub-step 170*a* may include subscribing to 'OnUpdated'-event ('IResourceCollection <TSelf, TResource, TEntity>'-interface of the 'Microsoft.Graph.Communications.Resources'-library of the 'Graph Communications'-SDK);

at a sub-step 170*b*, getting the video media streams of the participants—for example, the sub-step 170*b* may include, when the event update (for example new participant joined the call or existing participant started using video) is raised (subscribed to in sub-step 170*a*), selecting an instance of 'MediaStream'-class ('Microsoft.Graph'-library of the 'Graph Communications Core'-SDK), which has 'Video'-media type from the resource collection of the participant; and at a sub-step 170*c*, getting the one or more media stream source identifications—for example, the sub-step 170*c* may include getting 'SourceId'-property ('MediaStream'-class of the 'Microsoft.Graph'-library of the 'Graph Communications Core'-SDK) of the video media stream selected in sub-step 170*b*.

In one or more embodiments, the step 163 of mapping the one or more video media stream source identifications to the one or more video sockets includes calling 'Subscribe'-method ('IVideoSocket'-interface of the 'Microsoft.Skype.Bots.Media'-library of the 'Graph Communications Bot Media'-SDK) for video socket providing the video media stream source ID.

In one or more embodiments, the step 164 of getting the video frames includes, when 'VideoMediaReceived'-events ('IVideoSocket'-interface of the 'Microsoft.Skype.Bots.Media'-library of the 'Graph Communications Bot Media'-SDK) is raised (subscribed to in step 163), receiving collections of bytes from Microsoft Graph API which are H264 frames.

Figure 5:
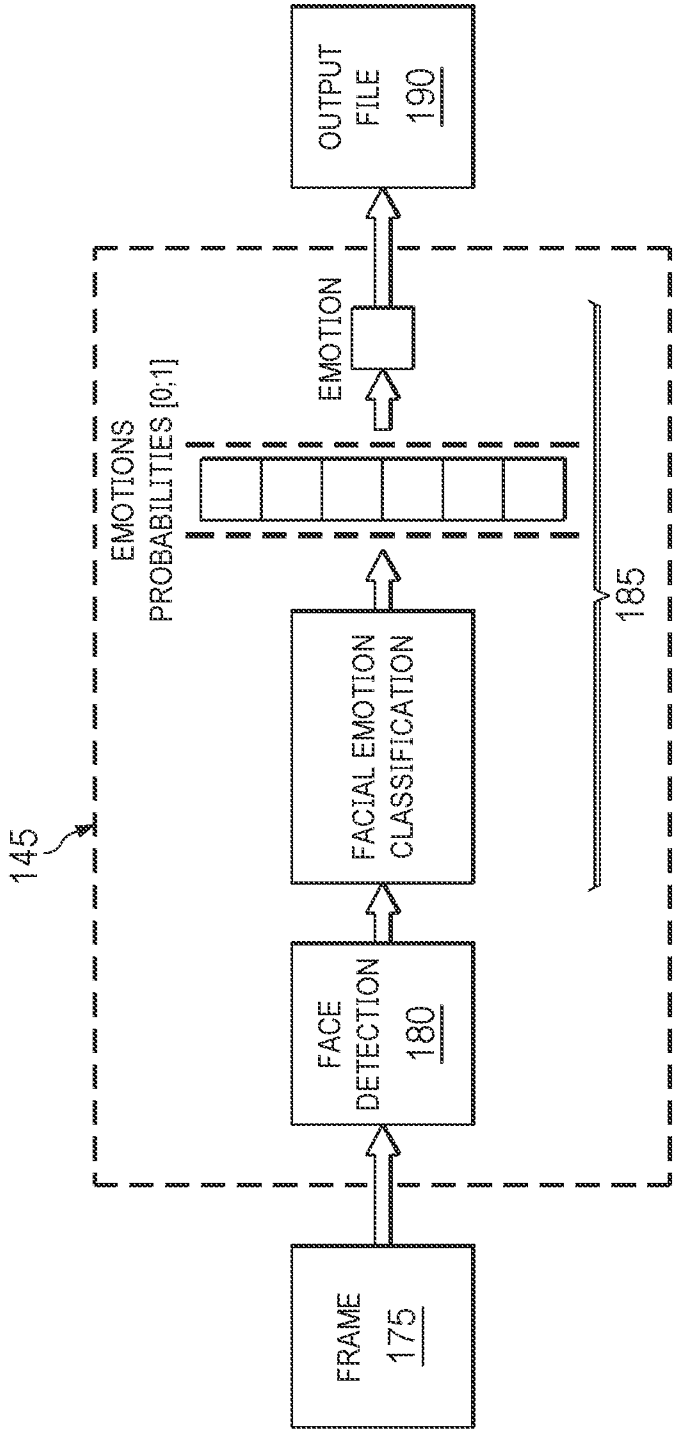
FIG. 5 is a diagrammatic illustration of a video emotion analyzer that is part of the architecture for analyzing emotion in one or more media streams of FIG. 3, according to one or more embodiments.

Referring to FIG. 5, with continuing reference to FIGS. 1 through 4, in an embodiment, the video emotion analyzer 145 receives video frames 175 (i.e., RGB files) from the recording application(s) 140. The video emotion analyzer 145 includes a face detection algorithm 180 operable to select faces from the received video frames 175. A facial emotion classification algorithm 185 is then operable to classify the facial emotions on detected faced based on a pre-trained neural network (e.g., a CNN), and to select the emotion with the highest probability value. Finally, the video emotion analyzer 145 is operable to save the data to an output file 190 (e.g., a CSV file).

Figure 6:
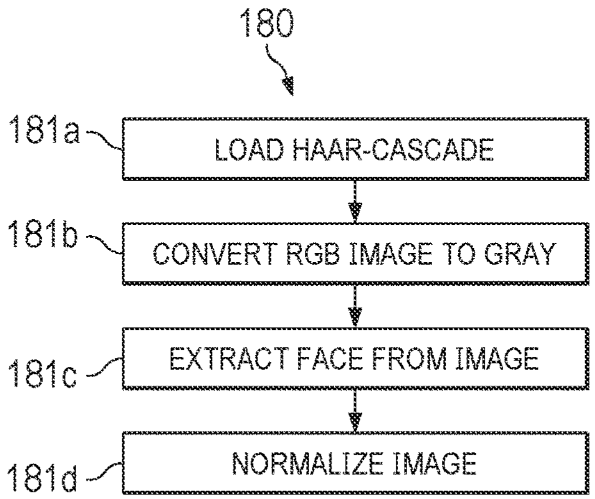
FIG. 6 is a flow diagram of a face detection algorithm at least partially executed by the video emotion analyzer of FIGS. 3 and 5, according to one or more embodiments.

Turning additionally to FIG. 6 with continuing reference to FIG. 5, in an embodiment, once a new video frame is received, a task for the face detection service is created, and the facial detection algorithm 180 includes:

at a step 181*a*, loading the Haar-Cascade—for example, the step 181*a* may include initializing a Haar-Cascade algorithm using 'cv2. CascadeClassifier( )' method from OpenCV library;

at a step 181*b*, converting the RGB image to gray—for example, the step 181*b* may include converting the received from into gray colors using 'cv2. cvtColor( )' method to reduce complexity in pixel values and use only one color channel;

at a step 181*c*, extracting a face from the image—for example, the step 181*c* may include executing the Haar-Cascade algorithm using 'detectMultiScale( )' method to extract the face location inside the frame in the form if a list of rectangles; and at a step 181*d*, normalizing the image—for example, the step 181*d* may include normalizing the range of pixels intensity values using 'astype(float)/255.0' method.

Figure 7:
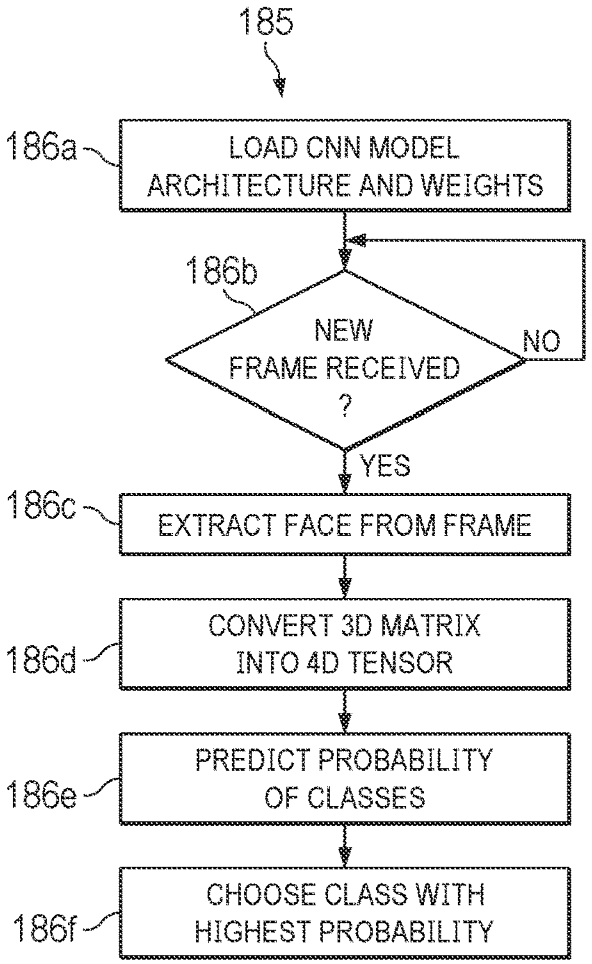
FIG. 7 is a flow diagram of a facial emotion classification algorithm at least partially executed by a neural network model that is part of the architecture for analyzing emotion in one or more media streams of FIG. 3, according to one or more embodiments.

Turning additionally to FIG. 7, with continuing reference to FIG. 5, in an embodiment, the facial emotion classification algorithm 185 (e.g., a pre-trained CNN model) includes:

at a step 186*a*, loading the CNN model architecture and weights—for example, the step 186*a* may include loading the CNN model architecture and weights using 'keras.models.load_model' method from the Keral library;

at a step 186*b*, receiving a new frame—for example, the step 186*b* may include the neural network model 150 waiting for a frame;

at a step 186*c*, extracting a face from the frame—for example, the step 186*c* may include extracting a face location from the frame using the facial detection algorithm 180 described above;

at a step 186*d*, converting the 3D matrix into a 4D tensor—for example, the step 186*d* may include using 'np.expand_dims(roi, axis=0)' method to convert the 3D matrix into a 4D tensor to use in the neural network;

at a step 186*e*, predicting the probability of classes—for example, the step 186*e* may include the neural network predicting a probability values of each emotion on the frame using 'model.predict( )' method from the Keras library; and at a step 186*f*, choosing the class with the highest probability—for example, the step 186*f* may include choosing the emotion with the highest probability using Python max(list) method.

Figure 8:
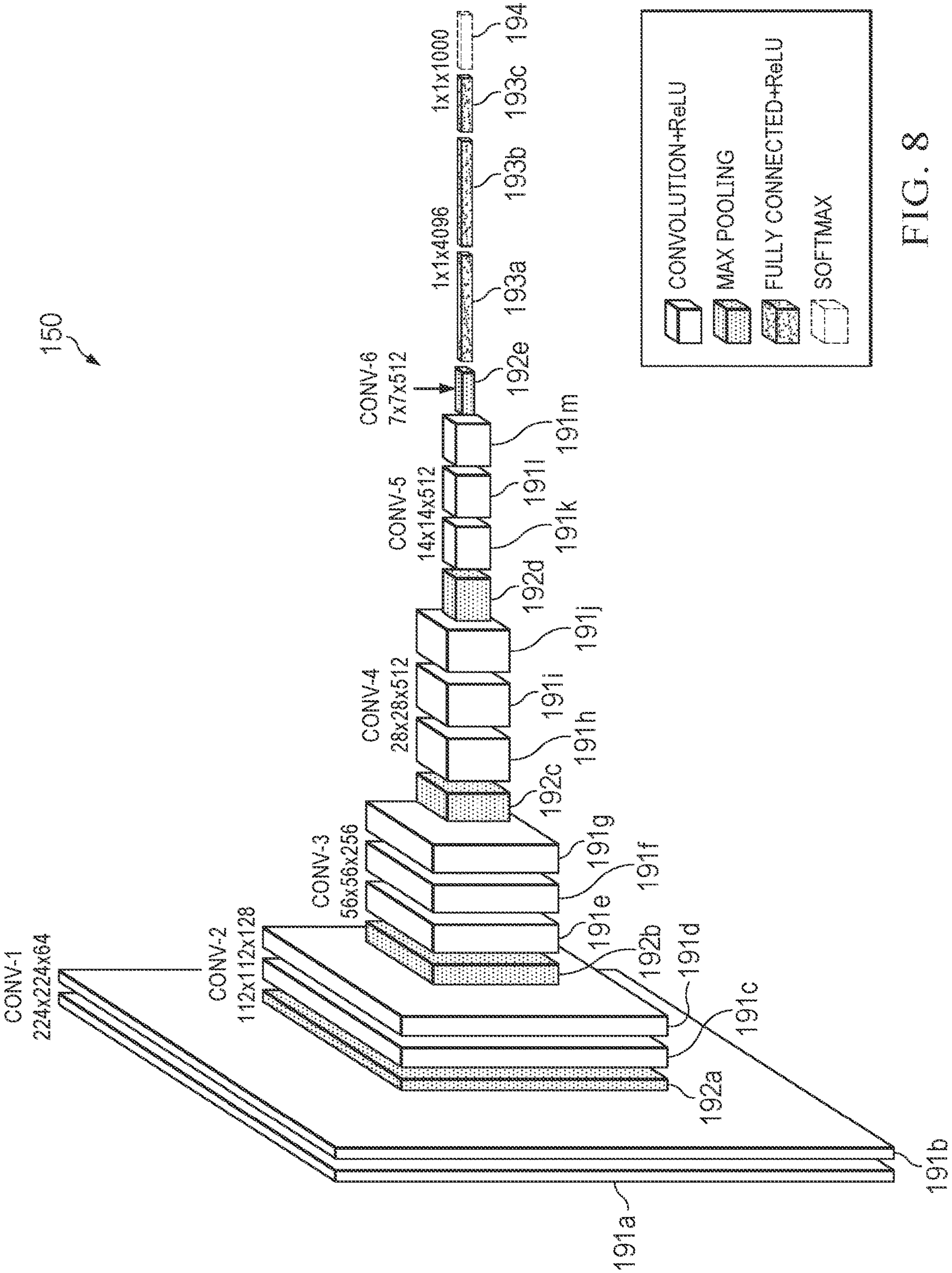
FIG. 8 is a diagrammatic illustration of the neural network model of FIGS. 3 and 7, according to one or more embodiments.

Referring to FIG. 8, with continuing reference to FIGS. 1 through 7, in an embodiment, the neural network model 150 utilizes the VGG-16 CNN architecture for emotion recognition. The VGG-16 CNN architecture contains twenty-one (21) total layers, of which sixteen (16) are weighted. More particularly, the VGG-16 CNN architecture includes thirteen (13) convolutional layers 191*a-m*, five (5) max pooling layers 192*a-e*, and three (3) dense layers 193*a-c*. The convolutional layers 191*a-b* (the "Conv-1" layers) each have 64 filters. The max pooling layer 192*a* and the convolutional layers 191*c-d* (the "Conv-2" layers) each have 128 filters. The max pooling layer 192*b* and the convolutional layers 191*e-g* (the "Conv-3" layers) each have 256 filters. The max pooling layer 192*c* and the convolutional layers 191*h-j* (the "Conv-4" layers) each have 512 filters. The max pooling layer 192*d* and the convolutional layers 191*k-m* (the "Conv-5" layers) also each have 512 filters. Finally, the max pooling layer 192*e* (the "Conv-6" layer) also has 512 filters. Three (3) fully-connected ("FC") layers 193*a-c* follow the stack of layers 191*a-m* and 192*a-e*: the first two (2) layers 193*a-b* have 4096 channels each, and the third layer 193*c* performs 1000-way ImageNet Large Scale Visual Recognition Challenge ("ILSVRC") classification and thus contains 1000 channels (one for each class). The final layer is the soft-max layer 194. In one or more embodiments, the VGG-16 CNN architecture may be trained on the FER2013 open dataset, which has 28,709 training examples of 48×48 pixel grayscale images of faces, seven (7) of basic human emotions (angry, disgust, fear, happy, neutral, sad, surprise, etc.), with 3,589 public test samples.

Figure 9:
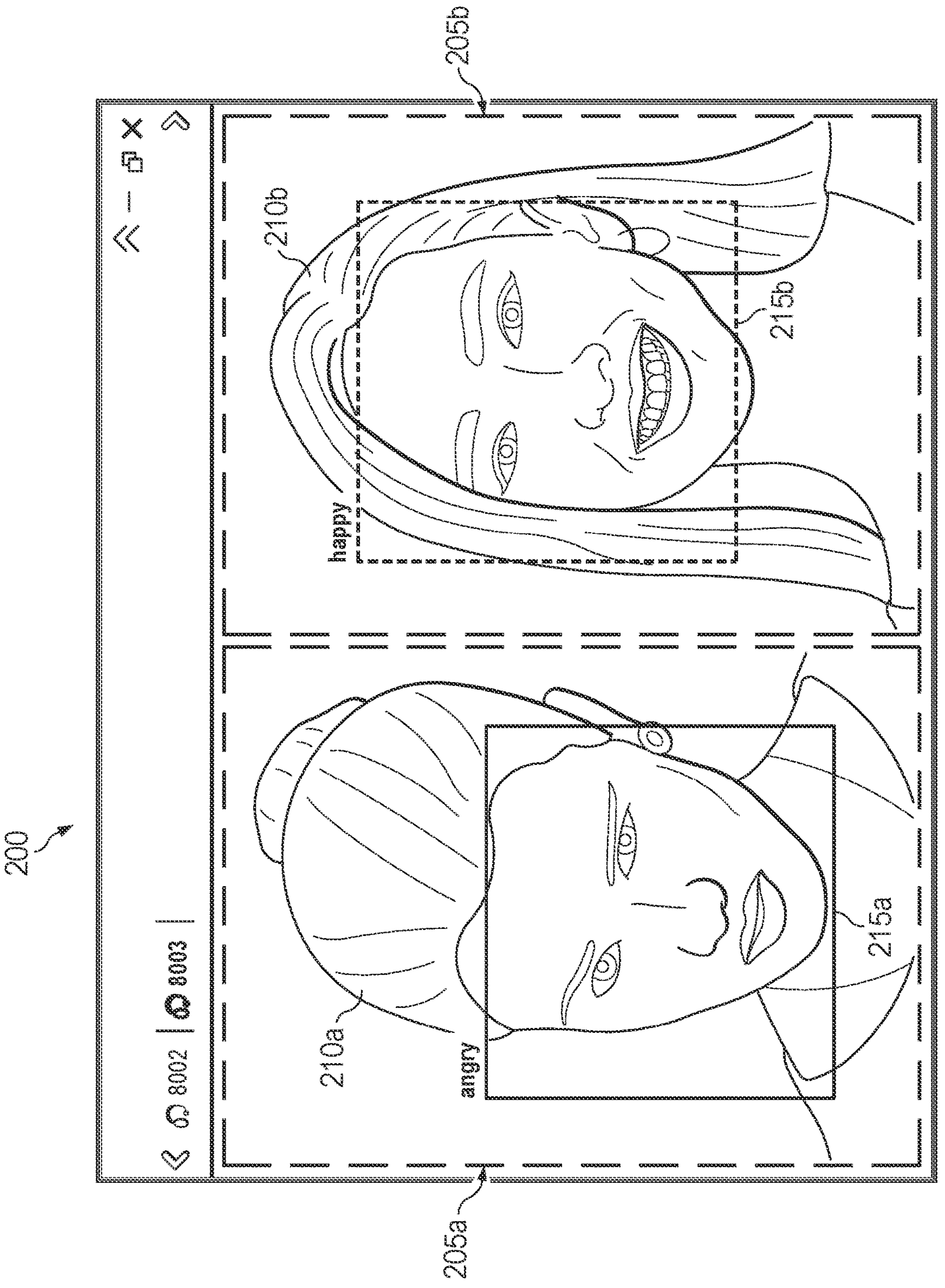
FIG. 9 is a graphical illustration of a visualization, said visualization associating one or more emotional scores with one or more videoconference participants, according to one or more embodiments.
Figure 10:
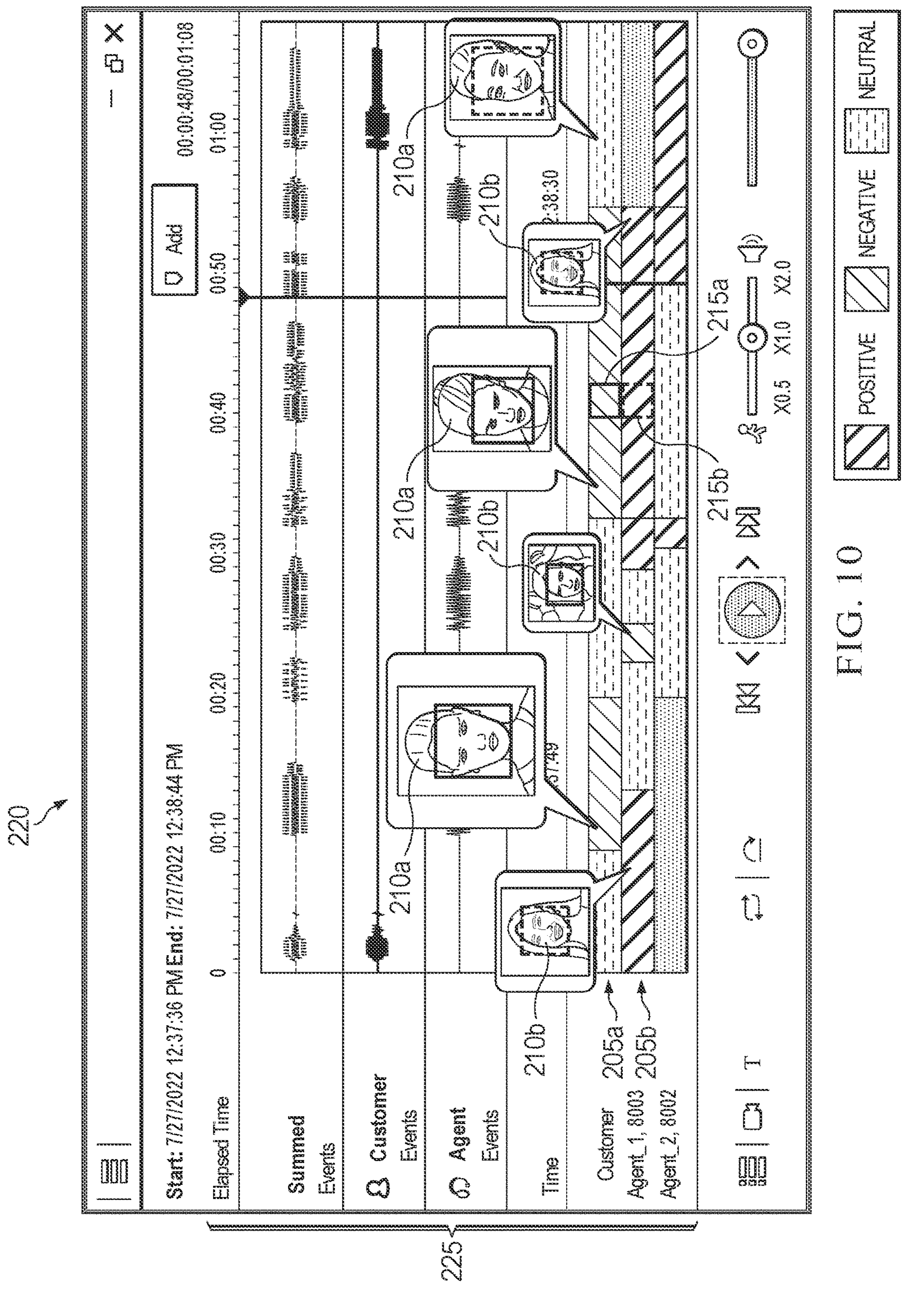
FIG. 10 is a graphical illustration of another visualization, said another visualization associating one or more emotional scores corresponding to one or more videoconference participants with a timeline, according to one or more embodiments.

Referring to FIGS. 9 and 10, with continuing reference to FIGS. 1 through 8, in an embodiment, a visualization (e.g., the NICE player) is generally referred to by the reference numeral 200. In one or more embodiments, the visualization 200 includes one or more video media streams 205*a-b* of one or more videoconference participants 210*a-b*. In one or more embodiments, the visualization 200 shows one or more emotional scores 215*a-b* (as determined by the video emotion analyzer 145 and the neural network model 150) in relation to the detected face(s) of the one or more videoconference participants. In one or more embodiments, the visualization 200 allows a user to choose whether or not to display the one or more emotional scores 215*a-b* during playback. In one or more embodiments, the one or more emotional scores 215*a-b* may be color-coded (e.g., red for angry, green for happy, etc.). Additionally, or alternatively, as shown in FIG. 10, the visualization 200 may include a timeline 225 representing the emotional chronology of the entire videoconference between the one or more videoconference participants 210*a-b*.

Figure 11:
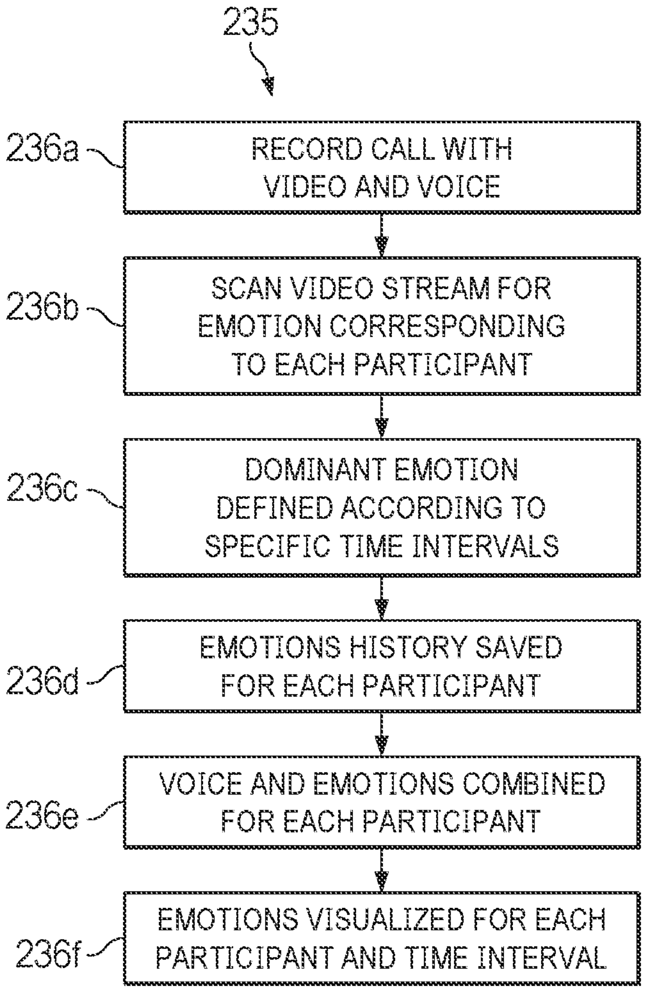
FIG. 11 is a flow diagram of a method for adding emotional scores to the visualizations of FIGS. 9 and 10, according to one or more embodiments.

Turning also to FIGS. 11 and 12, with continuing reference to FIGS. 9 and 10, in an embodiment, a method for adding the emotional scores to the visualization 200 is generally referred to by the reference numeral 235 (shown in FIG. 11), and includes:

at a step 236*a*, recording the call with video and voice—for example, the step 236*a* may include providing the visualization 200 with recorded audio and video using Graph API library and Microsoft Bot functionality, as described above in connection with at least FIGS. 1, 2, and 4;

at a step 236*b*, scanning the video stream for emotion for each videoconference participant—for example, the step 236*b* may include scanning the video frames for emotions for each videoconference participant, as described above in connection with at least FIGS. 5, 6, and 7;

at a step 236*c*, defining the dominant emotion per specific time interval for each videoconference participant—for example, the step 236*c* may include defining the dominant emotion per time interval by choosing the highest probability value, as described above in connection with at least step 186*f* shown in FIG. 7;

at a step 236*d*, saving the script with emotions history for each videoconference participant—for example, the step 236*d* may include saving an output file with information about videoconference participant emotions per time interval, as shown in FIG. 12;

at a step 236*e*, combining the voice and emotions per participant using the visualization 200; and at a step 236*f*, visualizing the one or more emotional scores 215*a-b*, optionally during playback, for each videoconference participant and time interval.

Figure 14:
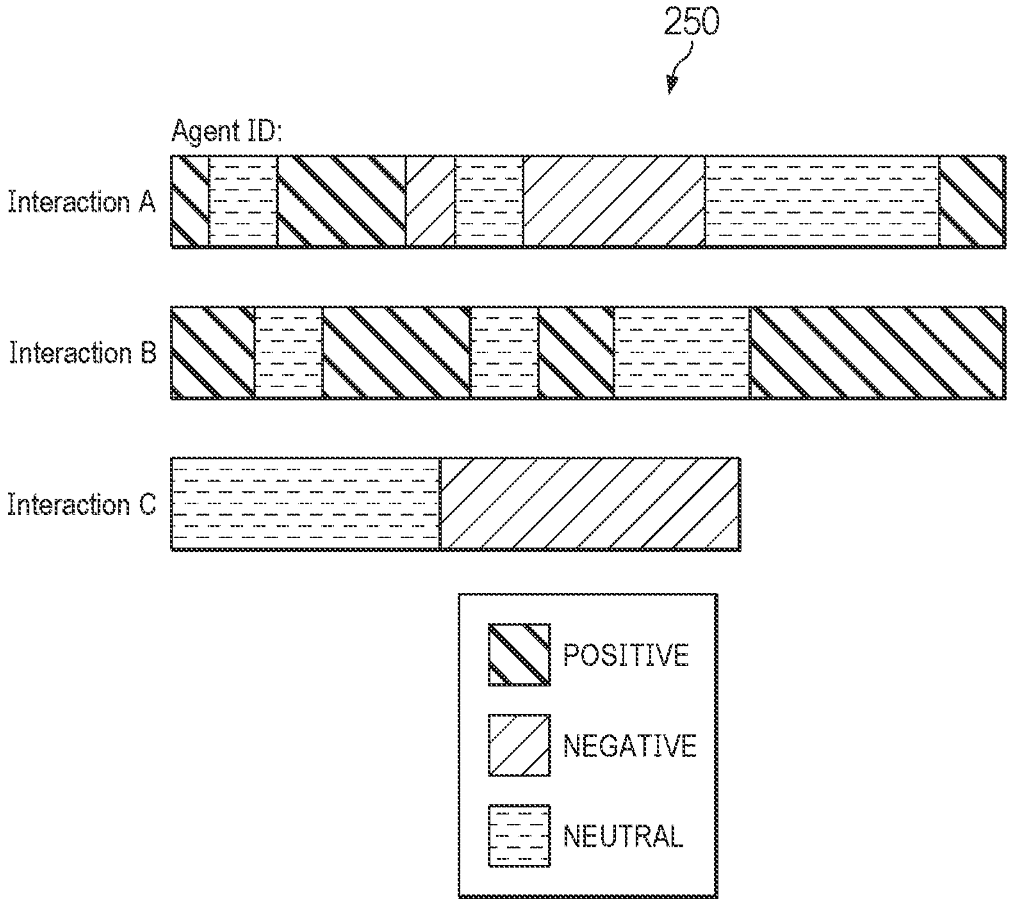
FIG. 14 is a graphical illustration of yet another visualization, said yet another visualization associating a combined emotional score for two or more videoconference participants with a timeline, according to one or more embodiments.

Referring to FIGS. 13 and 14, with continuing reference to FIGS. 9 through 12, in an embodiment, the visualization 200 marks each call with a specific emotional tag according to predefined logic, and outputs the tags in a business analyzer portal 240, together with an emotional score column 245 (shown in FIG. 13). As a result, a user can evaluate, with a single predefined emotional tag, the entire interaction according to a configured percentage threshold, which can be adjusted as needed or desired. The emotional tag may also be represented in the visualization 200 in relation to other call metadata. For example, each recorded interaction may be related to the agent who participated, and stored in a database with other call metadata (as shown in FIG. 12). Specifically, each interaction includes one or more video media streams corresponding to each participant, and each portion of the interaction (i.e., time segment) is passed to the algorithm for analysis to receive classification with a specific emotion (e.g., positive, negative, neutral, etc.), as described herein. The output is then stored in a database in relation to the specific interaction and time frame so that, during playback of the interaction, the visualization 200 can build a playback view based on the emotions analysis, agent identification, and (optionally) other call metadata. In one or more embodiments, each emotional score may be colored (or otherwise identified) according to the analyzed emotion type in the output file. Subsequently, the data may be sorted by agent identification and broken down per interaction and analyzed emotion type to evaluate said agent's performance, as shown in FIG. 14. In one or more embodiments, the interactions list is ranked and sorted by emotions detected. In one or more embodiments, a user can click individual zone(s) in each interaction to trigger playback and skip directly to any problematic area.

Figure 15:
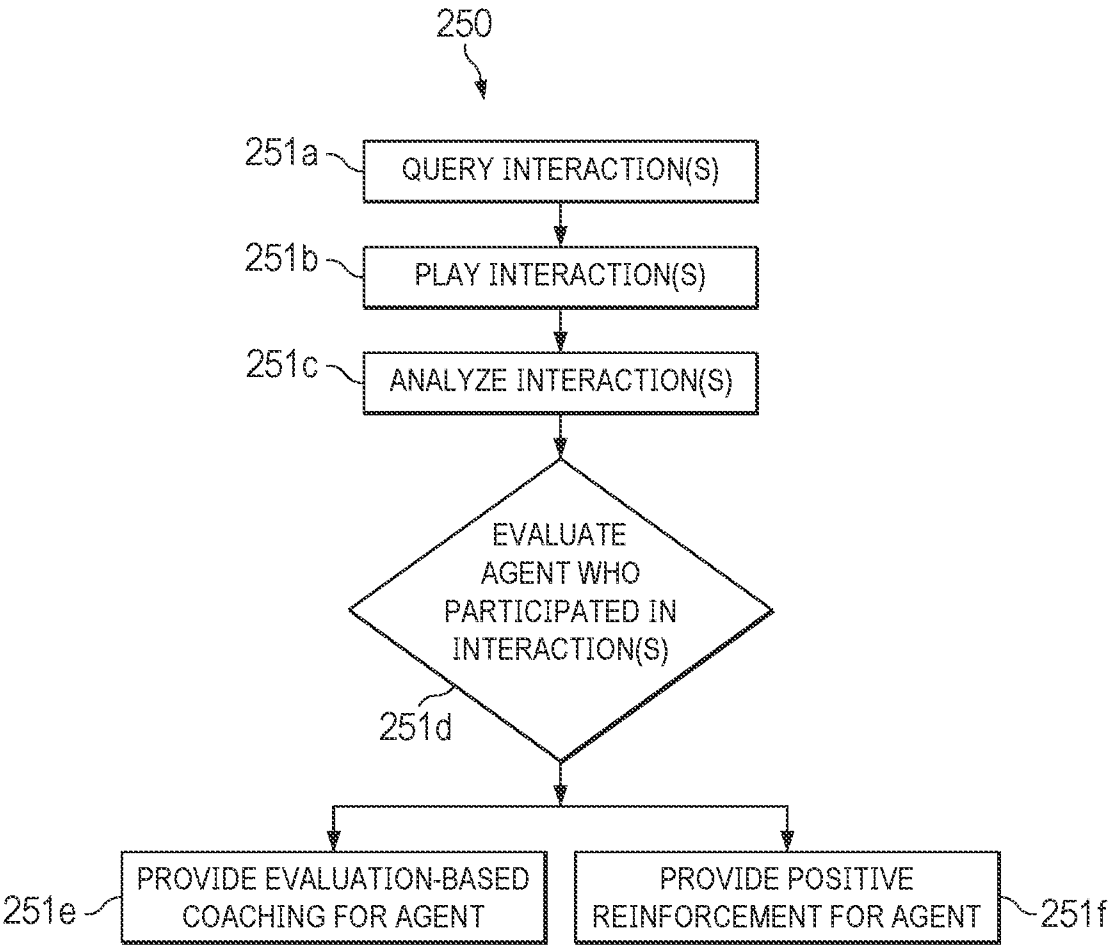
FIG. 15 is a flow diagram of a method for enhancing agent performance using emotions analysis data, according to one or more embodiments.

Referring to FIG. 15, with continuing reference to FIGS. 1 through 14, in an embodiment, a method for enhancing agent performance using emotions analysis data is generally referred to by the reference numeral 250, and includes:

at a step 251*a*, querying one or more interactions in which the agent participated—for example, the step 251*a* may include logging in to the business analyzer portal 240, and creating a query to find interactions with negative, positive, or neutral interactions using various filtering options (e.g., time period, agent, customer, interaction length, etc.);

at a step 251*b*, playing back the one or more interactions—for example, the step 251*b* may include initiating playback of an interaction in the visualization 200 (including video and audio) with emotions captions turned on (as shown in FIG. 9, for example);

at a step 251*c*, analyzing the one or more interactions—for example, the step 251*c* may include skipping directly to the part of the call marked with a negative, positive, or neutral emotions caption, and determining the root cause of said outcome by watching and listening to what was happening during the call;

at a step 251_d_, evaluating the agent who participated in the one or more interactions—for example the step 251_d_ may include using an evaluation form to assess the agent's performance during the call with the customer, assigning a performance score, and (optionally) indicating the agent's improvement or deterioration over a certain time period as a sign of the agent's general performance;

at a step 251_e_, providing evaluation-based coaching for the agent who participated in the one or more interactions, as will be described in further detail below; and at a step 251_f_, providing positive reinforcement for the agent who participated in the one or more interactions—for example, the step 251_f_ may include providing positive reinforcement for the well-performing agent in a similar manner as that described below in further detail with respect to the poorly-performing agent in step 251_e_—by creating a coaching package with criteria from example calls with positive emotional scores, and creating a plan that notifies well-performing agents with positive example calls, which can be listed and played back in a dedicated application.

Figure 16:
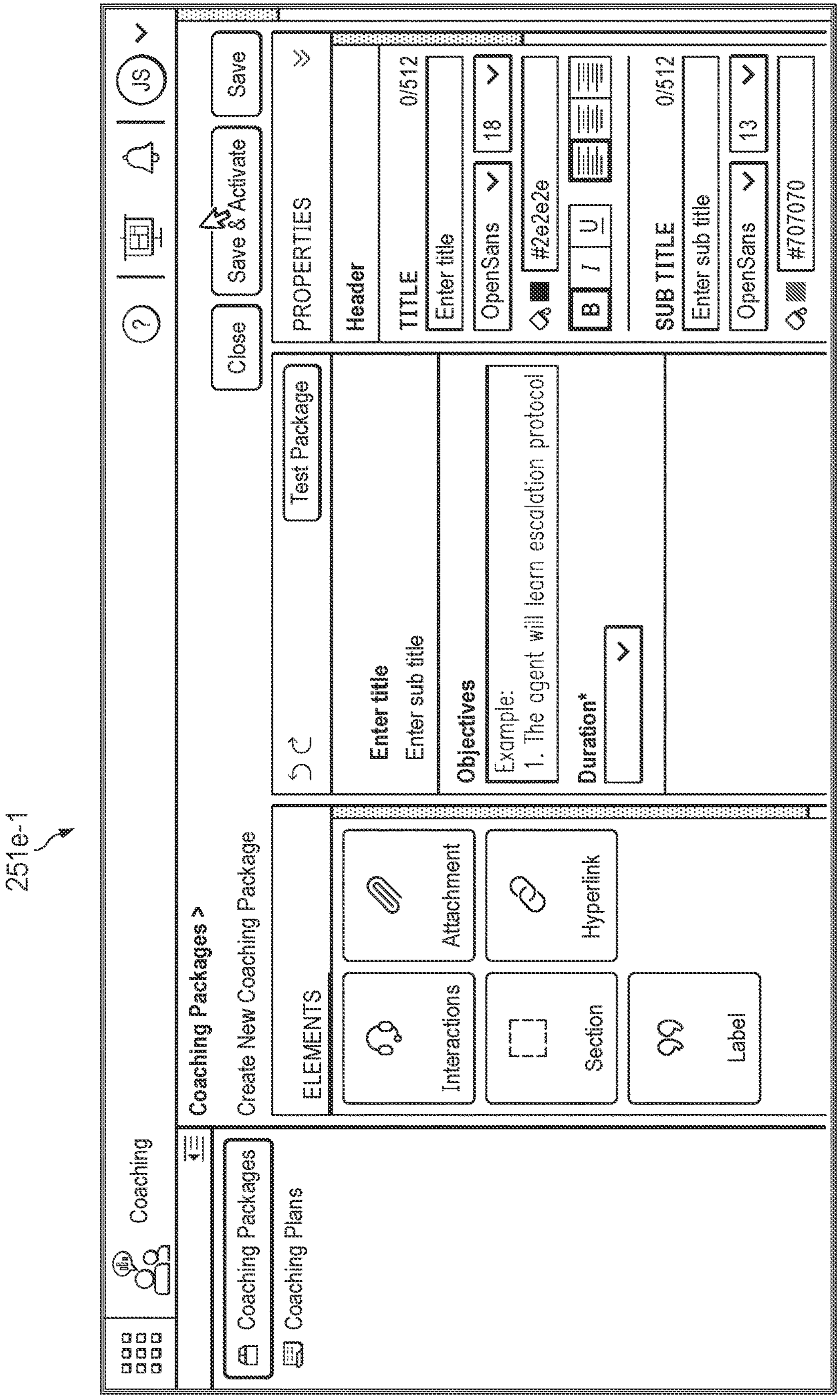
FIG. 16 is a graphical illustration of a sub-step of the method of FIG. 15, according to one or more embodiments.
Figure 17:
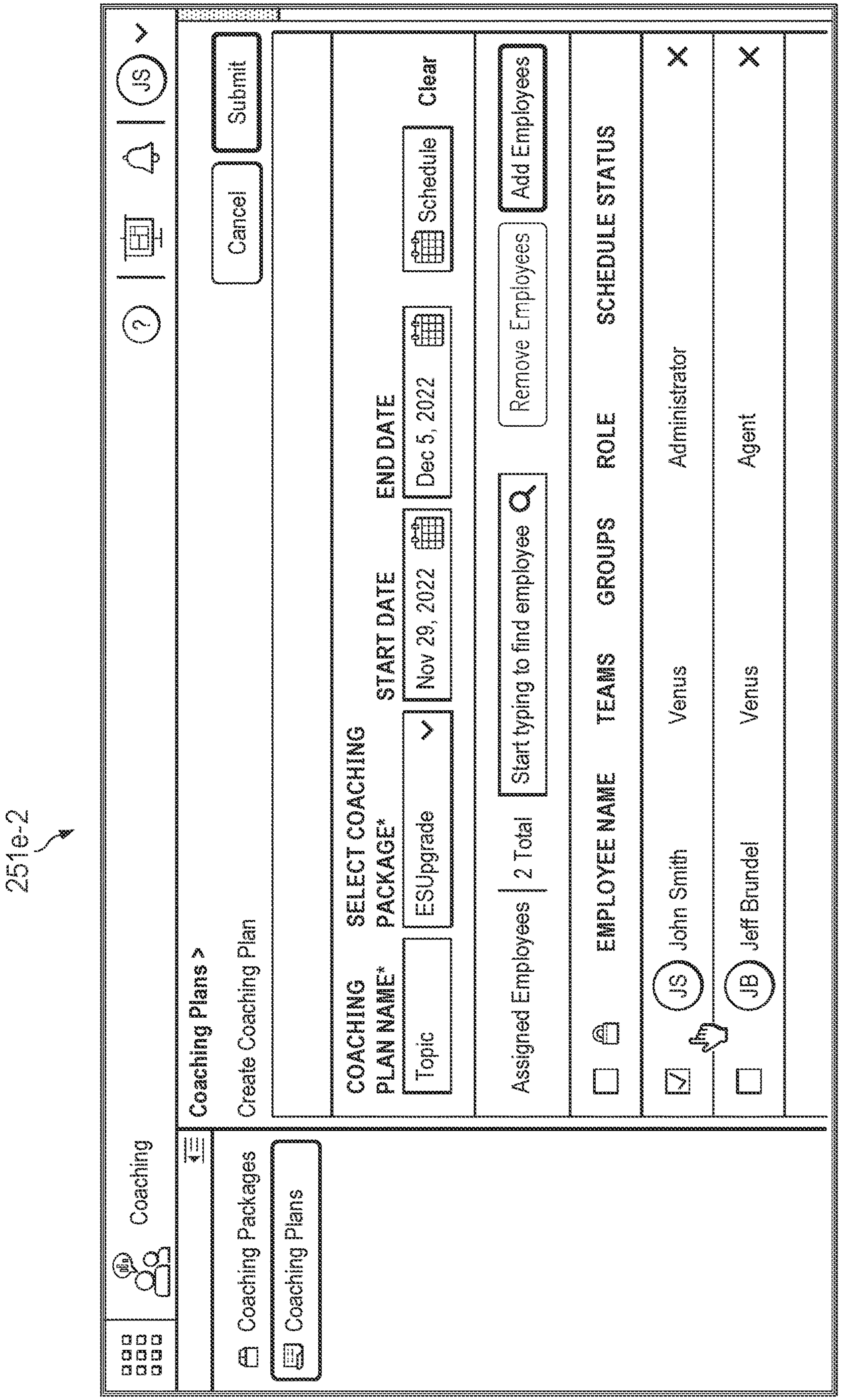
FIG. 17 is a graphical illustration of another sub-step of the method of FIG. 15, according to one or more embodiments.

Turning also to FIGS. 16 and 17, with continuing reference to FIG. 15, in an embodiment, the step 251_e_ of providing evaluation-based coaching for the agent who participated in the one or more interactions includes, creating a coaching package for the agent, which is dedicated to improving weak points in the agent's skills. For example, the coaching package may include various types of data, including, but not limited to, recording(s) of the interaction(s) (video and audio) with negative emotional scores indicated where the agent acted incorrectly, and accompanying supervisor comments and/or examples of similar interactions with positive emotional scores. FIGS. 16 and 17 illustrate details of the coaching package workflow process. More particularly, at a sub-step 251_e_-1, the coaching package is initialized by defining the coaching criteria by exactly which data will be searched and filtered (e.g., media type (audio/video/both), emotional score, etc.), as shown in FIG. 16. The requested media is then extracted from the recording solution (where the interactions exist with their corresponding analyzed video emotions score) into the created coaching package, which generally exists within a database. Then, at a sub-step 251_e_-2, the coaching package is assigned to one or more agents to review the selected interaction(s) according to the selected criteria, as shown in FIG. 17. For example, the coaching package may be assigned to particular agent(s) according to strengths and weakness identified during their evaluation(s).

Figure 18:
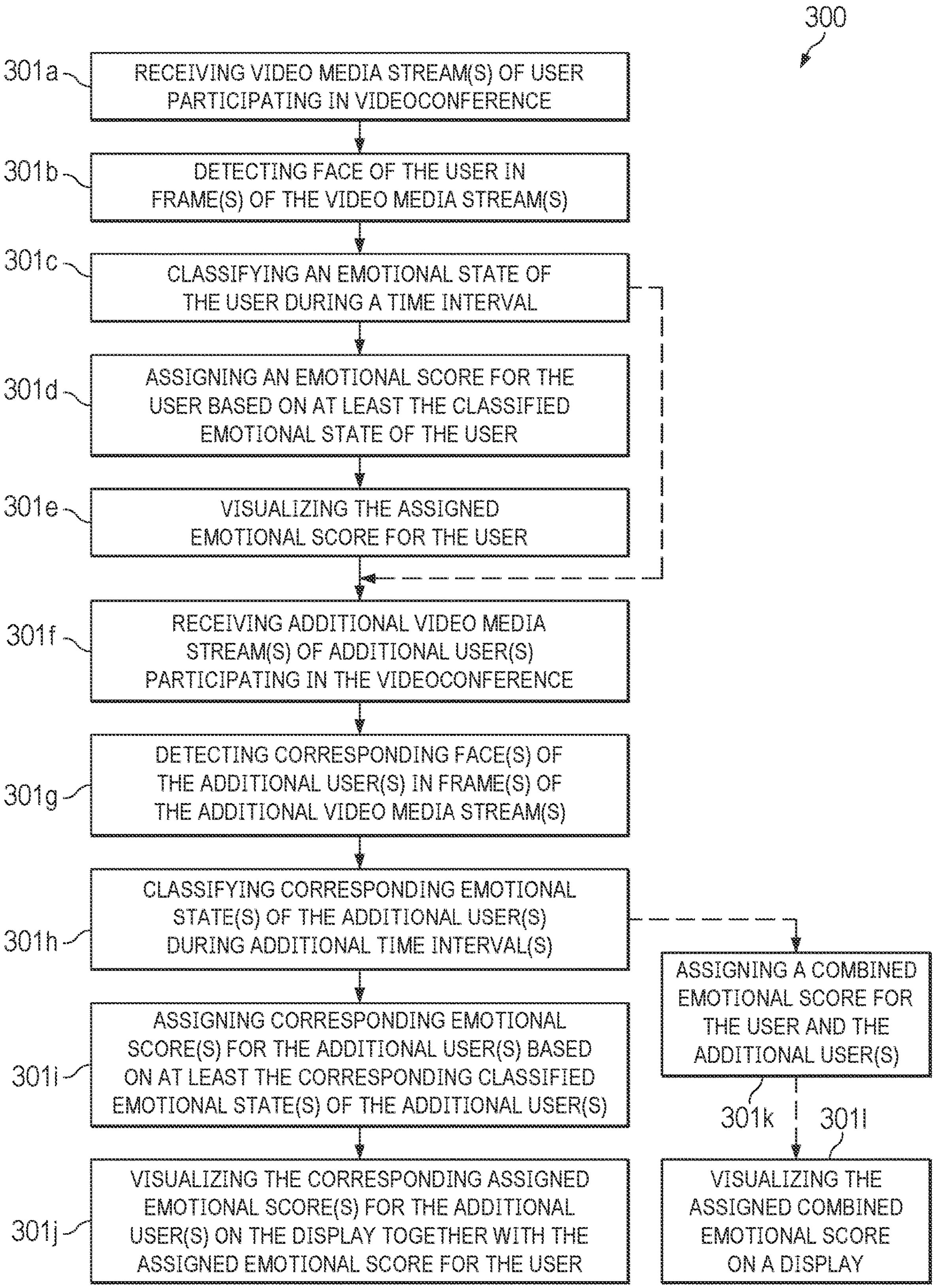
FIG. 18 is a flow diagram of a method for implementing one or more embodiments of the present disclosure.

Referring to FIG. 18, with continuing reference to FIGS. 1 through 17, in an embodiment, a method for analyzing emotion in one or more video media streams is generally referred to by the reference numeral 300, and includes:

at a step 301_a_, receiving, using a computing system, one or more video media streams of a user participating in a videoconference;

at a step 301_b_, detecting, using a facial detection algorithm of the computing system, a face of the user in one or more frames of the one or more video media streams;

at a step 301_c_, classifying, using an emotional recognition algorithm of the computing system, an emotional state of the user during a time interval based on the detected face of the user in the one or more frames of the one or more video media streams;

at a step 301_d_, assigning, using the computing system, an emotional score for the user based on at least the classified emotional state of the user during the time interval; and at a step 301_e_, visualizing the assigned emotional score for the user on a display.

In one or more embodiments, the emotional recognition algorithm analyzes the detected face of the user in the one or more frames of the one or more video media streams using a convolutional neural network to classify the emotional state of the user during the time interval.

In one or more embodiments, the method 300 further includes visualizing at least one of the one or more frames of the one or more video media streams on the display together with the assigned emotional score for the user. Additionally, or alternatively, in one or more embodiments, the method 300 further includes visualizing the time interval in relation to a timeline of the videoconference on the display together with the assigned emotional score for the user.

In one or more embodiments, the method 300 further includes:

at a step 301_f_, receiving, using the computing system, one or more additional video media streams of one or more additional users participating in the videoconference;

at a step 301_g_, detecting, using the facial detection algorithm, one or more corresponding faces of the one or more additional users in one or more frames of the one or more additional video media streams;

at a step 301_h_, classifying, using the emotional recognition algorithm, one or more corresponding emotional states of the one or more additional users during one or more additional time intervals based on the one or more corresponding detected faces of the one or more additional users in the one or more frames of the one or more additional video media streams;

at a step 301_i_, assigning, using the computing system, one or more corresponding emotional scores for the one or more additional users based on at least the one or more corresponding classified emotional states of the one or more additional users during the one or more additional time intervals; and at a step 301_j_, visualizing the one or more corresponding assigned emotional scores for the one or more additional users on the display together with the assigned emotional score for the user.

In one or more embodiments, at least one of the one or more additional time intervals is at least partially contemporaneous with the time interval.

In one or more embodiments, the method 300 further includes:

at a step 301_k_, assigning, using the computing system, a combined emotional score for the user and the one or more additional users based on at least: the classified emotional state of the user during the time interval, and the one or more corresponding classified emotional states of the one or more additional users during the one or more additional time intervals; and at a step 301_l_, visualizing the assigned combined emotional score for the user and the one or more additional users on a display.

In one or more embodiments, the method 300 includes the steps 301_a-e_, and the steps 301_f-l_ are omitted.

In one or more embodiments, the method 300 includes the steps 301_a-j_, and the steps 301_k-l_ are omitted.

In one or more embodiments, the method 300 includes the steps 301*a-c*, 301*f-h*, and 301*k-l*, and the steps 301*d-e* and 301*i-j* are omitted.

Figure 19:
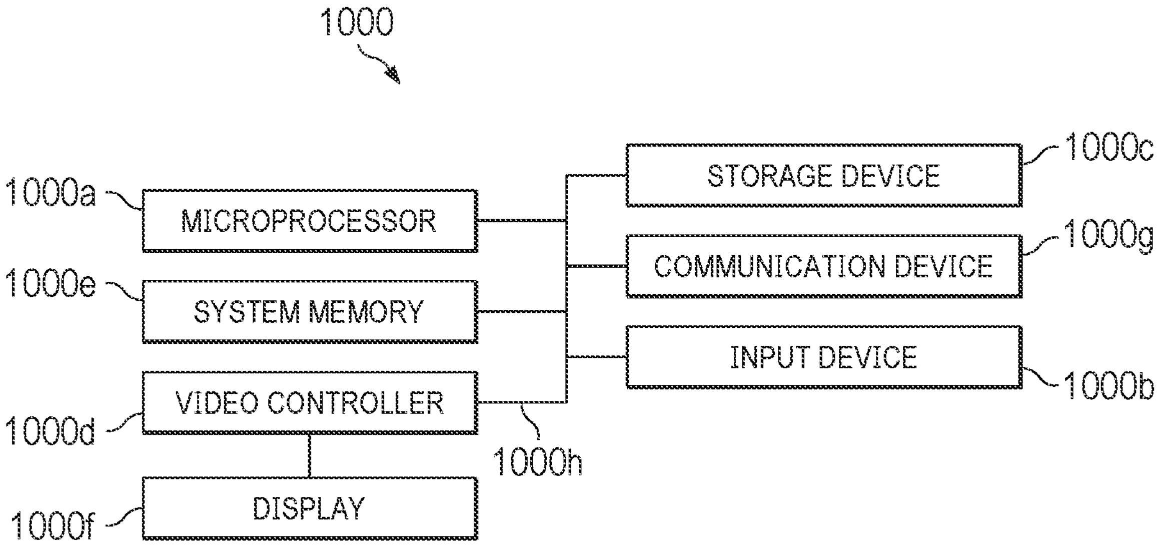
FIG. 19 is a diagrammatic illustration of a computing node for implementing one or more embodiments of the present disclosure.

Referring to FIG. 19, with continuing reference to FIGS. 1 through 18, an illustrative node 1000 for implementing one or more of the embodiments described above and/or illustrated in FIGS. 1 through 18 is depicted, including, without limitation, one or more of the above-described method(s), step(s), sub-step(s), algorithm(s), application(s), visualization(s), display(s), computing device(s), computing platform (s), account(s), architecture(s), system(s), apparatus(es), element(s), component(s), or any combination thereof.

The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In one or more embodiments, the storage device 1000*c* may include a hard drive, CD-ROM, optical drive, any other form of storage device and/or any combination thereof. In one or more embodiments, the storage device 1000*c* may include, and/or be capable of receiving, a CD-ROM, DVD-ROM, or any other form of non-transitory computer-readable medium that may contain executable instructions. In one or more embodiments, the communication device 1000*g* may include a modem, network card, or any other device to enable the node 1000 to communicate with other node(s). In one or more embodiments, the node and the other node(s) represent a plurality of interconnected (whether by intranet or Internet) computer systems, including without limitation, personal computers, mainframes, PDAs, smartphones and cell phones.

In one or more embodiments, one or more of the embodiments described above and/or illustrated in FIGS. 1 through 18 include at least the node 1000 and/or components thereof, and/or one or more nodes that are substantially similar to the node 1000 and/or components thereof. In one or more embodiments, one or more of the above-described components of the node 1000 and/or the embodiments described above and/or illustrated in FIGS. 1 through 18 include respective pluralities of same components.

In one or more embodiments, one or more of the embodiments described above and/or illustrated in FIGS. 1 through 18 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in one or more embodiments pulls real-time information from one or more servers, automatically refreshing with latest information at a predetermined time increment; or any combination thereof.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable an embodiment of the present disclosure. In an embodiment, a data structure may provide an organization of data, or an organization of executable code.

In one or more embodiments, any networks and/or one or more portions thereof may be designed to work on any specific architecture. In an embodiment, one or more portions of any networks may be executed on a single computer, local area networks, client-server networks, wide area networks, internets, hand-held and other portable and wireless devices and networks.

In one or more embodiments, a database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In an embodiment, the data contained in the location of a character file can be mapped to a field in a second table. In one or more embodiments, the physical location of the database is not limiting, and the database may be distributed. In an embodiment, the database may exist remotely from the server, and run on a separate platform. In an embodiment, the database may be accessible across the Internet. In one or more embodiments, more than one database may be implemented.

In one or more embodiments, a plurality of instructions stored on a non-transitory computer readable medium may be executed by one or more processors to cause the one or more processors to carry out or implement in whole or in part one or more of the embodiments described above and/or illustrated in FIGS. 1 through 18, including, without limitation, one or more of the above-described method(s), step (s), sub-step(s), algorithm(s), application(s), visualization (s), display(s), computing device(s), computing platform(s), account(s), architecture(s), system(s), apparatus(es), element(s), component(s), or any combination thereof. In one or more embodiments, such a processor may include one or more of the microprocessor 1000*a*, any processor(s) that is/are part of one or more of the embodiments described above and/or illustrated in FIGS. 1 through 18, including, without limitation, one or more of the above-described method(s), step(s), sub-step(s), algorithm(s), application(s), visualization(s), display(s), computing device(s), computing platform(s), account(s), architecture(s), system(s), apparatus (es), element(s), or component(s), and/or any combination thereof, and such a computer readable medium may be distributed among one or more components of the system. In one or more embodiments, such a processor may execute the plurality of instructions in connection with a virtual computer system. In one or more embodiments, such a plurality of instructions may communicate directly with the one or more processors, and/or may interact with one or more operating systems, middleware, firmware, other applications, and/or any combination thereof, to cause the one or more processors to execute the instructions.

A method of analyzing emotion in one or more video media streams has been disclosed according to one or more embodiments. The method generally includes: receiving, using a computing system, one or more video media streams of a user participating in a videoconference; detecting, using a facial detection algorithm of the computing system, a face of the user in one or more frames of the one or more video media streams; classifying, using an emotional recognition algorithm of the computing system, an emotional state of the user during a time interval based on the detected face of the user in the one or more frames of the one or more video media streams; assigning, using the computing system, an emotional score for the user based on at least the classified emotional state of the user during the time interval; and visualizing the assigned emotional score for the user on a display. In one or more embodiments, the emotional recognition algorithm analyzes the detected face of the user in the one or more frames of the one or more video media streams using a convolutional neural network to classify the emotional state of the user during the time interval. In one or more embodiments, the method further includes: visualizing at least one of the one or more frames of the one or more video media streams on the display together with the assigned emotional score for the user. In one or more embodiments, the method further includes: visualizing the time interval in relation to a timeline of the videoconference on the display together with the assigned emotional score for the user. In one or more embodiments, the method further includes: receiving, using the computing system, one or more additional video media streams of one or more additional users participating in the videoconference; detecting, using the facial detection algorithm, one or more corresponding faces of the one or more additional users in one or more frames of the one or more additional video media streams; classifying, using the emotional recognition algorithm, one or more corresponding emotional states of the one or more additional users during one or more additional time intervals based on the one or more corresponding detected faces of the one or more additional users in the one or more frames of the one or more additional video media streams; and assigning, using the computing system, one or more corresponding emotional scores for the one or more additional users based on at least the one or more corresponding classified emotional states of the one or more additional users during the one or more additional time intervals. In one or more embodiments, at least one of the one or more additional time intervals is at least partially contemporaneous with the time interval. In one or more embodiments, the method further includes: visualizing the one or more corresponding assigned emotional scores for the one or more additional users on the display together with the assigned emotional score for the user. In one or more embodiments, the method further includes: assigning, using the computing system, a combined emotional score for the user and the one or more additional users based on at least: the classified emotional state of the user during the time interval; and the one or more corresponding classified emotional states of the one or more additional users during the one or more additional time intervals. In one or more embodiments, the method further includes: visualizing the assigned combined emotional score for the user and the one or more additional users on a display.

A system for analyzing emotion in one or more video media streams has also been disclosed according to one or more embodiments. The system generally includes: a non-transitory computer readable medium; and a plurality of instructions stored on the non-transitory computer readable medium and executable by one or more processors to implement the following steps: receiving one or more video media streams of a user participating in a videoconference; detecting a face of the user in one or more frames of the one or more video media streams; classifying an emotional state of the user during a time interval based on the detected face of the user in the one or more frames of the one or more video media streams; assigning an emotional score for the user based on the classified emotional state of the user during the time interval; and visualizing the assigned emotional score for the user on a display. In one or more embodiments, classifying the emotional state of the user during the time interval includes analyzing the detected face of the user in the one or more frames of the one or more video media streams using a convolutional neural network. In one or more embodiments, the plurality of instructions are executable by the one or more processors to implement the following additional step: visualizing at least one of the one or more frames of the one or more video media streams on the display together with the assigned emotional score for the user. In one or more embodiments, the plurality of instructions are executable by the one or more processors to implement the following additional step: visualizing the time interval in relation to a timeline of the videoconference on the display together with the assigned emotional score for the user. In one or more embodiments, the plurality of instructions are executable by the one or more processors to implement the following additional steps: receiving one or more additional video media streams of one or more additional users participating in the videoconference; detecting one or more corresponding faces of the one or more additional users in one or more frames of the one or more additional video media streams; classifying one or more corresponding emotional states of the one or more additional users during one or more additional time intervals based on the one or more corresponding detected faces of the one or more additional users in the one or more frames of the one or more additional video media streams; and assigning one or more corresponding emotional scores for the one or more additional users based on the one or more corresponding classified emotional states of the one or more additional users during the one or more additional time intervals. In one or more embodiments, at least one of the one or more additional time intervals is at least partially contemporaneous with the time interval. In one or more embodiments, the plurality of instructions are executable by the one or more processors to implement the following additional step: visualizing the one or more corresponding assigned emotional scores for the one or more additional users on the display together with the assigned emotional score for the user. In one or more embodiments, the plurality of instructions are executable by the one or more processors to implement the following additional step: assigning a combined emotional score for the user and the one or more additional users based on the classified emotional state of the user during the time interval, and the one or more corresponding classified emotional states of the one or more additional users during the one or more additional time intervals. In one or more embodiments, the plurality of instructions are executable by the one or more processors to implement the following additional step: visualizing the assigned combined emotional score for the user and the one or more additional users on a display.

A non-transitory computer readable medium has also been disclosed according to one or more embodiments. The non-transitory computer readable medium generally has stored thereon computer-readable instructions executable by one or more processors to perform operations which include: classifying, using an emotional recognition algorithm of a computing system and based on a detected face of a user in one or more frames of one or more video media streams, an emotional state of the user participating in a videoconference; classifying, using the emotional recognition algorithm and based on one or more corresponding detected faces of one or more additional users in one or more frames of one or more additional video media streams, one or more corresponding emotional states of the one or more additional users participating in the videoconference; wherein: the operations further include: assigning, using the computing system, an emotional score for the user based on at least the classified emotional state of the user; and visualizing, on a display, the assigned emotional score for the user together with at least one of the one or more frames of the one or more video media streams and/or a timeline of the videoconference; or the operations further include: assigning, using the computing system, the emotional score for the user based on at least the classified emotional state of the user; assigning, using the computing system, one or more corresponding emotional scores for the one or more additional users based on at least the one or more corresponding classified emotional states of the one or more additional users; and visualizing, on the display, the one or more corresponding assigned emotional scores for the one or more additional users together with the assigned emotional score for the user; or the operations further include: assigning, using the computing system, a combined emotional score for the user and the one or more additional users based on at least the classified emotional state of the user and the one or more corresponding classified emotional states of the one or more additional users; and visualizing, on the display, the assigned combined emotional score for the user and the one or more additional users; or any combination thereof. In one or more embodiments, the emotional recognition algorithm analyzes the detected face of the user in the one or more frames of the one or more video media streams using a convolutional neural network to classify the emotional state of the user; and wherein the emotional recognition algorithm analyzes the one or more corresponding detected faces of the one or more additional users in the one or more frames of the one or more additional video media streams using the convolutional neural network to classify the one or more corresponding emotional states of the one or more additional users.

It is understood that variations may be made in the foregoing without departing from the scope of the present disclosure.

In several embodiments, the elements and teachings of the various embodiments may be combined in whole or in part in some (or all) of the embodiments. In addition, one or more of the elements and teachings of the various embodiments may be omitted, at least in part, and/or combined, at least in part, with one or more of the other elements and teachings of the various embodiments.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, which comprises:

receiving, using a computing system, an interaction between an agent and a customer comprising one or more video media streams of the customer participating in a videoconference;

dividing the interaction into a plurality of time intervals;

passing each time interval of the plurality of time intervals to a facial detection algorithm of the computing system;

detecting, using the facial detection algorithm of the computing system, a face of the customer in one or more frames of the one or more video media streams;

classifying, using an emotional recognition algorithm of the computing system, an emotional state of the customer during each time interval of the plurality of time intervals based on the detected face of the customer in the one or more frames of the one or more video media streams;

assigning, using the computing system, an emotional score to the customer based on at least the classified emotional state of the customer during each time interval;

providing a visualization of each time interval in relation to a timeline of the videoconference on a display together with the assigned emotional score of the customer and the one or more video media streams of the customer;

receiving a selection of a time interval from the plurality of time intervals on the timeline;

playing back a video stream of the customer corresponding to the selected time interval; and evaluating the agent in the interaction based on the playback.

2. The method of claim 1, wherein the emotional recognition algorithm analyzes the detected face of the customer in the one or more frames of the one or more video media streams using a convolutional neural network to classify the emotional state of the customer during each time interval.

3. The method of claim 1, which further comprises visualizing at least one of the one or more frames of the one or more video media streams on the display together with the assigned emotional score of the customer.

4. The method of claim 1, which further comprises:

receiving, using the computing system, one or more additional video media streams of one or more additional customers participating in the videoconference;

detecting, using the facial detection algorithm, one or more corresponding faces of the one or more additional customers in one or more frames of the one or more additional video media streams;

classifying, using the emotional recognition algorithm, one or more corresponding emotional states of the one or more additional customers during one or more additional time intervals based on the one or more corresponding detected faces of the one or more additional customers in the one or more frames of the one or more additional video media streams; and assigning, using the computing system, one or more corresponding emotional scores to the one or more additional customers based on at least the one or more corresponding classified emotional states of the one or more additional customers during the one or more additional time intervals.

5. The method of claim 4, wherein at least one of the one or more additional time intervals is at least partially contemporaneous with the selected time interval.

6. The method of claim 4, which further comprises visualizing the one or more corresponding assigned emotional scores of the one or more additional customers on the display together with the assigned emotional score for the customer.

7. The method of claim 4, which further comprises assigning, using the computing system, a combined emotional score of the customer and the one or more additional customers based on at least:

the classified emotional state of the customer during the selected time interval; and the one or more corresponding classified emotional states of the one or more additional users during the one or more additional time intervals.

8. The method of claim 7, which further comprises visualizing the assigned combined emotional score of the customer and the one or more additional customers on a display.

9. The method of claim 1, wherein detecting, using a facial detection algorithm of the computing system, a face of the user in one or more frames of the one or more video media streams comprises:

initializing a Haar-Cascade algorithm;

converting a red, green, and blue (RGB) image to a gray image;

extracting a face from the gray image; and normalizing the gray image.

10. A system, which comprises:

a non-transitory computer readable medium; and a plurality of instructions stored on the non-transitory computer readable medium and executable by one or more processors to implement the following steps:

receiving an interaction between an agent and a customer comprising one or more video media streams of the customer participating in a videoconference;

dividing the interaction into a plurality of time intervals;

passing each time interval of the plurality of time intervals to a computing system;

detecting a face of the customer in one or more frames of the one or more video media streams;

classifying an emotional state of the customer during each time interval of the plurality of time intervals based on the detected face of the customer in the one or more frames of the one or more video media streams;

assigning an emotional score to the customer based on the classified emotional state of the customer during each time interval;

providing a visualization of each time interval in relation to a timeline of the videoconference on a display together with the assigned emotional score of the customer and the one or more video media streams of the customer;

receiving a selection of a time interval from the plurality of time intervals on the timeline;

playing back a video stream of the customer corresponding to the selected time interval; and evaluating the agent in the interaction based on the playback.

11. The system of claim 10, wherein classifying the emotional state of the customer during each time interval comprises analyzing the detected face of the customer in the one or more frames of the one or more video media streams using a convolutional neural network.

12. The system of claim 10, wherein the plurality of instructions are executable by the one or more processors to implement the following additional step:

visualizing at least one of the one or more frames of the one or more video media streams on the display together with the assigned emotional score of the customer.

13. The system of claim 10, wherein the plurality of instructions are executable by the one or more processors to implement the following additional steps:

receiving one or more additional video media streams of one or more additional customers participating in the videoconference;

detecting one or more corresponding faces of the one or more additional customers in one or more frames of the one or more additional video media streams;

classifying one or more corresponding emotional states of the one or more additional customers during one or more additional time intervals based on the one or more corresponding detected faces of the one or more additional customers in the one or more frames of the one or more additional video media streams; and assigning one or more corresponding emotional scores to the one or more additional customers based on the one or more corresponding classified emotional states of the one or more additional customers during the one or more additional time intervals.

14. The system of claim 13, wherein at least one of the one or more additional time intervals is at least partially contemporaneous with the selected time interval.

15. The system of claim 13, wherein the plurality of instructions are executable by the one or more processors to implement the following additional step:

visualizing the one or more corresponding assigned emotional scores of the one or more additional customers on the display together with the assigned emotional score of the customer.

16. The system of claim 13, wherein the plurality of instructions are executable by the one or more processors to implement the following additional step:

assigning a combined emotional score to the customer and the one or more additional customers based on the classified emotional state of the customer during the selected time interval, and the one or more corresponding classified emotional states of the one or more additional customers during the one or more additional time intervals.

17. The system of claim 16, wherein the plurality of instructions are executable by the one or more processors to implement the following additional step:

visualizing the assigned combined emotional score of the customer and the one or more additional customers on a display.

18. The system of claim 10, wherein detecting a face of the user in one or more frames of the one or more video media streams comprises:

initializing a Haar-Cascade algorithm;

converting a red, green, and blue (RGB) image to a gray image;

extracting a face from the gray image; and normalizing the gray image.

19. A non-transitory computer readable medium having stored thereon computer-readable instructions executable by one or more processors to perform operations which comprise:

receiving an interaction between an agent and a customer comprising one or more video media streams of the customer participating in a videoconference;

dividing the interaction into a plurality of time intervals;

passing each time interval of the plurality of time intervals to a computing system;

classifying, using an emotional recognition algorithm of a computing system and based on a detected face of the customer in one or more frames of one or more video media streams, an emotional state of the customer participating in a videoconference during each time interval of the plurality of time intervals;

assigning, using the computing system, an emotional score to the customer based on at least the classified emotional state of the customer;

providing a visualization of each time interval in relation to a timeline of the videoconference on a display together with the assigned emotional score of the customer and the one or more video media streams of the customer;

receiving a selection of a time interval from the plurality of time intervals on the timeline;

playing back a video stream of the customer corresponding to the selected time interval; and evaluating the agent in the interaction based on the playback.

20. The non-transitory computer readable medium of claim 19, wherein the emotional recognition algorithm analyzes the detected face of the customer in the one or more frames of the one or more video media streams using a convolutional neural network to classify the emotional state of the customer.

* * * * *